(12) United States Patent
Chilton

(10) Patent No.: US 7,234,021 B1
(45) Date of Patent: Jun. 19, 2007

(54) METHODS AND APPARATUS FOR ACCESSING DATA ELEMENTS USING IMPROVED HASHING TECHNIQUES

(75) Inventor: Kendell A. Chilton, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 984 days.

(21) Appl. No.: 09/972,314

(22) Filed: Oct. 8, 2001

(51) Int. Cl.
G06F 12/02 (2006.01)

(52) U.S. Cl. .................................... 711/113
(58) Field of Classification Search ............ 711/113, 711/118
See application file for complete search history.

(56) References Cited

U.S. PATENT DOCUMENTS

| 4,490,782 A | * | 12/1984 | Dixon et al. ................. 364/200 |
| 4,972,316 A | * | 11/1990 | Dixon et al. ................. 364/200 |
| 5,778,430 A | * | 7/1998 | Ish et al. ...................... 711/133 |
| 5,835,940 A | * | 11/1998 | Yorimitsu et al. ............ 711/112 |
| 6,237,046 B1 | * | 5/2001 | Ohmura et al. ............... 710/1 |

OTHER PUBLICATIONS

Kendell A. Chilton; "Methods and Apparatus for Accessing a Doubly Linked List in a Data Storage System"; Filed on Oct. 5, 2001.
Kendell A. Chilton; "A Data Storage System Having an Improved Memory Circuit Board"; Filed on Oct. 5, 2001.

* cited by examiner

Primary Examiner—Kevin L. Ellis
(74) Attorney, Agent, or Firm—BainwoodHuang

(57) ABSTRACT

A data storage system has disk drives, memory circuit boards to store a set of hash lists and a cache, and a front-end interface. The front-end interface is configured to receive a data element request including a disk address identifying a set of disk drive locations that stores the data element; perform a hash function on the disk address in order to generate a hash pointer; and provide a search command, the disk address and the generated hash pointer to the memory circuit boards. The memory circuit boards are configured to receive the search command, the disk address, and the hash pointer from the front-end interface; search the set of hash lists based on the hash pointer and the disk address; and provide an indication to the front-end interface indicating whether the set of hash lists includes an entry indicating that the data element resides in cache.

22 Claims, 15 Drawing Sheets

METHODS AND APPARATUS FOR ACCESSING DATA ELEMENTS USING IMPROVED HASHING TECHNIQUES

BACKGROUND OF THE INVENTION

A typical data storage system includes an input/output (I/O) cache and a set of disk drives. The I/O cache is volatile storage (i.e., semiconductor memory) that temporarily buffers data transferred between an external device (e.g., a host) and the set of disk drives.

One conventional data storage system further includes a front-end interface and a back-end interface. The front-end interface operates as an interface between the external device and the I/O cache by moving blocks of data (e.g., 512 byte sections) between the external device and the I/O cache. The back-end interface operates as an interface between the I/O cache and the set of disk drives by moving the data blocks between the I/O cache and the set of disk drives.

Conventional data storage systems such as the one described above typically use a track table to determine whether data blocks, which reside in the set of disk drives, also reside in the I/O cache. For example, suppose that the external device requests a particular data block. If the requested data block resides in the I/O cache (e.g., due to the external device recently writing the data block to the I/O cache, due to previously reading the data block from the I/O cache, due to prefetching the data block from the set of disk drives, etc.), the data storage system can quickly fulfill the request by simply providing the requested data block from the I/O cache, rather than retrieving the requested data block all the way from the set of disk drives.

The above-described conventional data storage system uses a track table to keep track of which data blocks reside in the I/O cache. The track table includes an entry for every data block location available in the set of disk drives. If a particular data block in the set of disk drives does not reside in the I/O cache, the entry in the track table for that data block includes an empty pointer (e.g., NULL). In response to a request for the data block, the front-end interface finds the empty pointer in the track table entry for that data block and notifies the back-end interface to transfer the data block to the I/O cache. After the back-end interface transfers the data block to the I/O cache, the front-end interface conveys the data block from the I/O cache to the external device.

However, if the particular data block in the set of disk drives also resides in the I/O cache, the entry in the track table for that data block includes a pointer to the location (i.e., a cache slot) of the data block in the I/O cache (e.g., a cache slot which is addressable by the disk, cylinder and head location of the particular data block on disk). In this situation, when the front-end interface looks in the track table, the front-end interface finds an I/O cache pointer in the entry for the data block rather than an empty pointer. Accordingly, the front-end interface can provide the data block from the I/O cache to the external device without having to retrieve the data block from the set of disk drives and thus avoid burdening the back-end interface.

SUMMARY OF THE INVENTION

Unfortunately, there are deficiencies to above-described conventional approach to providing data blocks based on a track table which includes an entry for every data block location available in a set of disk drives of a data storage system. For example, the size of the track table grows in relationship to the storage capacity of the set of disk drives, i.e., the growth of disk density. With the trend toward larger capacity disk drives, some data storage systems can or will soon be able to provide many terabytes of disk storage capacity (e.g., 60 to 70 terabytes). Such a storage size requires or will require several gigabytes of semiconductor memory just for storing the track table (e.g., 16 gigabytes). This demand for semiconductor memory, in addition to the semiconductor memory to be used as the I/O cache, is a substantial amount which not only drives the cost of the data storage system up, but imposes excessive resource burdens (e.g., higher power requirements, larger cabinets and cabinet footprints for holding the additional hardware, etc.).

One possible alternative to the above-described conventional approach is to create a single list of entries that corresponds to every location within the I/O cache, and to search the single list of entries to determine whether data blocks are in the I/O cache. For instance, when the front-end interface receives a request for a particular data block identified by a particular disk location (e.g., disk, cylinder and head identifiers), the front-end interface can search the single list of entries for an entry containing that location. If the front-end interface finds such an entry in the single list of entries, the front-end interface can provide the data residing in the cache slot corresponding to that entry and thus avoid accessing the set of disk drives. However, if the front-end interface does not find such an entry, the front-end interface then accesses the data from the set of disk drives. Although this alternative results in a single list of entries that scales with the size of the I/O cache rather than the capacity of the set of disk drives, the single list of entries can grow to be quite long as the size of the I/O cache increases. That is, when the I/O cache is large, searching the entire single list in response to each request for a data block is extremely cumbersome (e.g., searching the single list of entries ties up the communications mechanism between the front-end interface and the I/O cache) and no longer delivers acceptable performance (e.g., response time).

In contrast to the above-described conventional track table approach and the alternative single list of entries approach, embodiments of the invention are directed to techniques for accessing data elements (e.g., blocks of data) using a set of hash lists. The use of the set of hash lists alleviates the need for a track table that scales with the size of the set of disk drives as in the above-described track table approach, and requires less time to determine whether data blocks can be accessed from the cache compared to the above-described single list of entries approach. Furthermore, operations which access the set of hash lists can be performed within a set of memory circuit boards that stores the set of hash lists rather than another circuit board (e.g., a front-end interface circuit board) in order to, among other things, (i) provide superior performance, (ii) free the other circuit board to perform other tasks, and (iii) reduce traffic and associated latencies in the interconnection mechanism between the set of memory circuit boards and the other circuit board.

One embodiment is directed to a data storage system having a set of disk drives to store a data element, a set of memory circuit boards to store a set of hash lists and a cache, and a front-end interface coupled to the set of disk drives and the set of memory circuit boards. The front-end interface is configured to (i) receive a request for the data element, the request including a disk address identifying a set of disk drive locations that stores the data element, (ii) perform a hash function on the disk address in order to generate a hash pointer, and (iii) provide a search command, the disk address and the generated hash pointer to the set of memory circuit boards. The set of memory circuit boards is configured to (i) receive the search command, the disk address, and the hash pointer from the front-end interface, (ii) search the set of hash lists based on the hash pointer and the disk address, and (iii) provide an indication to the front-end interface indicating whether the set of hash lists includes an entry indicating that the data element resides in cache. The use of the hash function enables each hash list (i) to remain relatively short and (ii) to include caching information relating to only a portion of the cache. As such, a determination as to whether a data element resides in the cache can be made by simply searching one of the hash lists for quick response time. Furthermore, the burden of searching the hash list is on the set of memory circuit boards thus freeing both the front-end interface (e.g., to perform other operations) as well as the communications mechanism connecting the front-end interface with the set of memory circuit boards.

In one arrangement, the set of memory circuit boards is configured to search the set of hash lists by (i) selecting a hash list from the set of hash lists based on the hash pointer, each hash list including a set of entries, each entry including a disk address field; and (ii) determining whether the disk address of the request for the data element matches contents of the disk address field of an entry of the selected hash list in order to ascertain whether the set of hash lists includes an entry indicating that the cache stores the data element. The set of hash lists includes an entry indicating that the cache stores the data element when the disk address matches contents of the disk address field of an entry of the selected hash list. The set of hash lists does not include an entry indicating that the cache stores the data element when the disk address does not match contents of the disk address field of any entry of the selected hash list. Accordingly, the set of memory circuit boards does not need to search every entry in the set of hash lists, but only entries in the selected hash list until it finds an entry indicating that the cache stores the data element, or until it has searched the entire selected hash list (and has determined that the data element is not available in the cache) thus providing an acceptable response time.

In one arrangement, a second disk address identifies caching of a second data element. In this arrangement, the front-end interface circuit board is further configured to perform the hash function on the second disk address in order to generate a second hash pointer. Additionally, the set of memory circuit boards is further configured to add, to the set of hash lists, a second entry based on the generated second hash pointer and the second disk address. The second entry identifies the second data element. Accordingly, the set of memory circuit boards (rather than the front-end interface) can add entries to the set of hash lists thus freeing the front-end interface to perform other operations.

In one arrangement, the set of memory circuit boards is configured to add the second entry by selecting a hash list of the set of hash lists based on the second hash pointer, and attaching the second entry to the selected hash list. Preferably, the selected hash list is a linked list data structure, and one of the set of memory circuit boards is configured to attach the second entry by placing the second entry at a head of the linked list data structure. Placing the second entry at the head rather than the tail can simply involving inserting the second entry in front of the original head and avoid having to traverse the entire hash list. Furthermore, the oldest entry is at the tail and the newest entry is at the head thus enabling the data storage system to easily know which entries are the newest and oldest. For example, the set of memory circuit boards can be further configured to determine a number of entries in the selected hash list, and delete a third entry from the tail of the linked list data structure, i.e., selected hash list, when the number of entries in the selected hash list is greater than a predetermined limit. Accordingly, when selected hash list becomes excessively long, the least recently used entry can be removed from the selected hash list in order to conserve or limit the amount of memory space used by the hash list.

In one arrangement, the disk address includes a disk identifier that identifies a particular disk of the set of disks, a cylinder identifier that identifies a particular cylinder, and a head identifier that identifies a particular head. The set of memory circuit boards is configured to search the set of hash lists by (i) selecting a hash list of the set of hash lists based on the generated hash pointer, each hash list including a set of entries, each entry including a disk address field, and (ii) comparing the disk address to contents of the disk address field of at least one entry in the selected hash list to determine whether the data element is cached.

In one arrangement, the set of memory circuit boards is configured to provide a data element identified by a particular entry of the selected hash list regardless of whether the disk address exactly matches with contents of the disk address field of the particular entry when the disk identifier of the disk address matches with a disk identifier in the contents of the disk address field of the particular entry. If it is later determined that the data element is not the one that was requested, the front-end interface can be directed to ignore that data element. However, if it is later determined that the data element is the one that was requested, time has been saved by providing the data element before the operation, which determines whether the data element is the one that was requested, has fully completed.

The features of the invention, as described above, may be employed in computerized systems (e.g., data storage systems, general purpose computers, specialized computers, etc.), devices and methods such as those of EMC Corporation of Hopkinton, Mass.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for accessing data elements (e.g., blocks of data) using a set of hash lists. The use of the set of hash lists alleviates the need for a conventional track table that scales with the size of the set of disk drives, and requires less time to determine whether data blocks can be accessed from the cache than searching a single list of entries that corresponds to every location within the cache. Moreover, operations which access the set of hash lists can be performed within a set of memory circuit boards that stores the set of hash lists rather than another circuit board (e.g., a front-end interface circuit board) in order to, among other things, (i) provide superior performance, (ii) free the other circuit board to perform other tasks, and (iii) reduce traffic in the interconnection mechanism between the set of memory circuit boards and the other circuit board and avoid latencies otherwise associated with such traffic.

Figure 1:
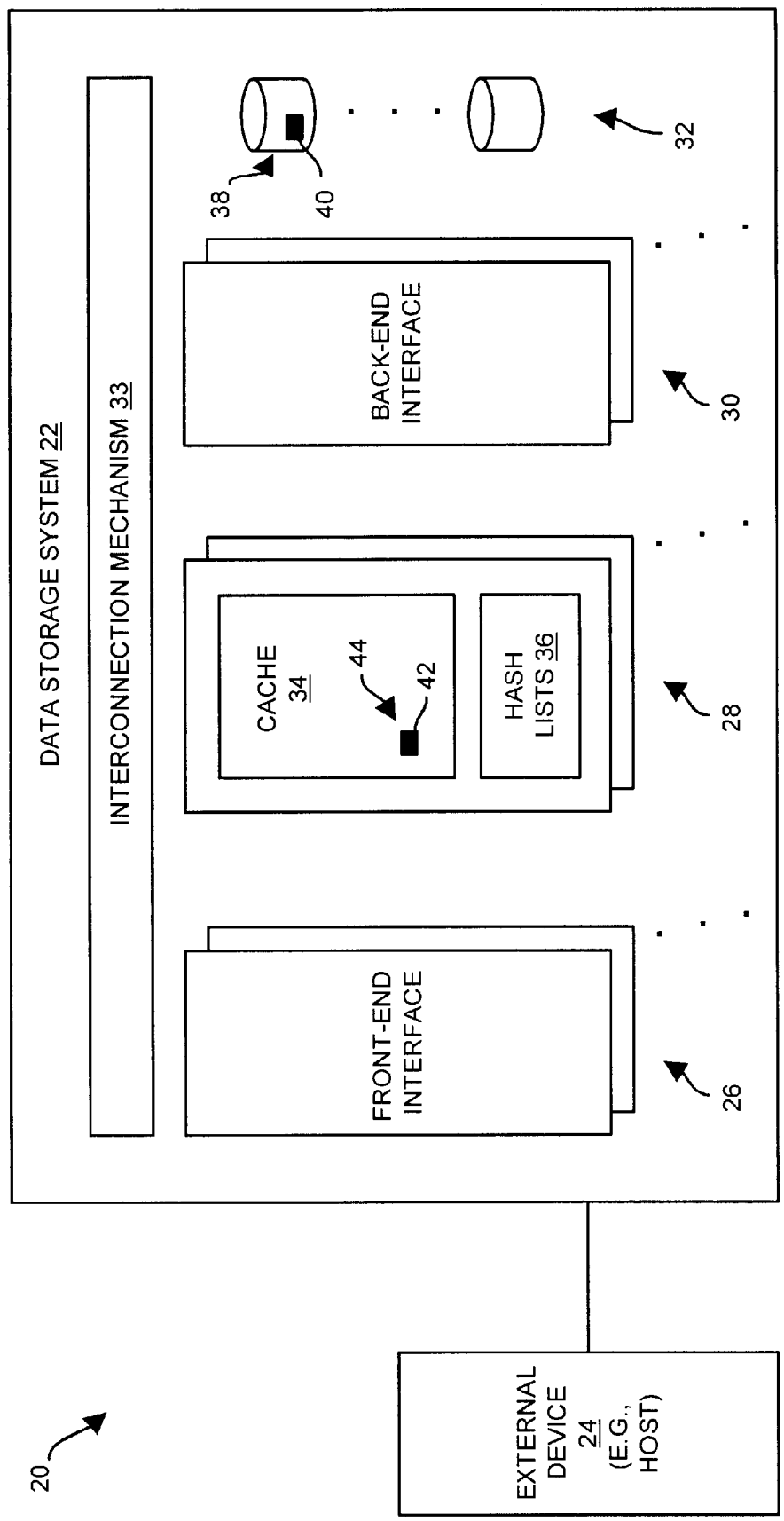
FIG. 1 is a block diagram of a data storage system configuration which is suitable for use by the invention.

FIG. 1 shows a data storage system configuration 20 which is suitable for use by the invention. The data storage system configuration 20 includes a data storage system 22 and an external device 24 (e.g., a host). The data storage system 22 includes a set of front-end interfaces 26, a set of memory circuit boards 28, a set of back-end interfaces 30, a set of disk drives 32 and an interconnection mechanism 33. The interconnection mechanism 33 (e.g., one or more backplanes for a set of buses, cables for block I/O communications, etc.) electrically couples the data storage system components 26, 28, 30, 32 together within a set of electronic cabinets.

The set of back-end interfaces 30 operates as an interface between the cache 34 and the set of disk drives 32. Similarly, the set of front-end interfaces 26 operates as an interface between the external device 24 and the cache 34. In some arrangements and as shown in FIG. 1, the set of front-end interfaces 26 includes multiple (i.e., more than one) front-end interfaces 26, and the set of back-end interfaces 30 includes multiple back-end interfaces 30 for increased throughput and/or fault tolerance.

As further shown in FIG. 1, the set of memory circuit boards 28 includes a cache 34 and a set of hash lists 36. The cache 34 operates as a temporary buffer (i.e., volatile storage) for data elements exchanged between the external device 24 and the set of disk drives 32. In some situations (e.g., when a copy of a data element resides in the cache 34), the external device 24 can retrieve a data element from the cache 34 without needing to access the set of disk drives 32. The set of hash lists 36 indicates which data elements, which are stored in the set of disk drives 32, also reside in the cache 34. In some arrangements, the set of memory circuit boards 28 includes multiple memory circuit boards 28 for increased volatile storage capacity.

When the set of memory circuit boards 28 includes multiple memory circuit boards 28, the cache 34 and the set of hash lists 36 can be distributed across more than one memory circuit board 28 for load balancing purposes. In one arrangement, the cache 34 and the set of hash lists 36 reside together across multiple memory circuit boards 28. In another arrangement, the cache 34 resides in one group of memory circuit boards 28 (i.e., one or more memory circuit boards 28), and the set of hash lists 36 reside in another group of memory circuit boards 28.

As shown in FIG. 1, and by way of example only, the set of disk drives 32 includes a set of storage locations 38 that stores a data element 40 (e.g., a block of data). A copy 42 of the data element 40 resides in a set of storage locations 44 (e.g., a cache slot) of the cache 34. In contrast to non-volatile storage provided by the set of disk drives 32, the set of memory circuit boards 28 provides volatile semiconductor memory which is more quickly accessible than the non-volatile storage provided by the set of disk drives 32. As will be explained in further detail later, the set of front-end interfaces 26 and the set of memory circuit boards 28 can use the set of hash lists 36 to determine whether the copy 42 of the data element 40 resides in the cache 34. Further details of the invention will now be provided with reference to FIG. 2.

Figure 2:
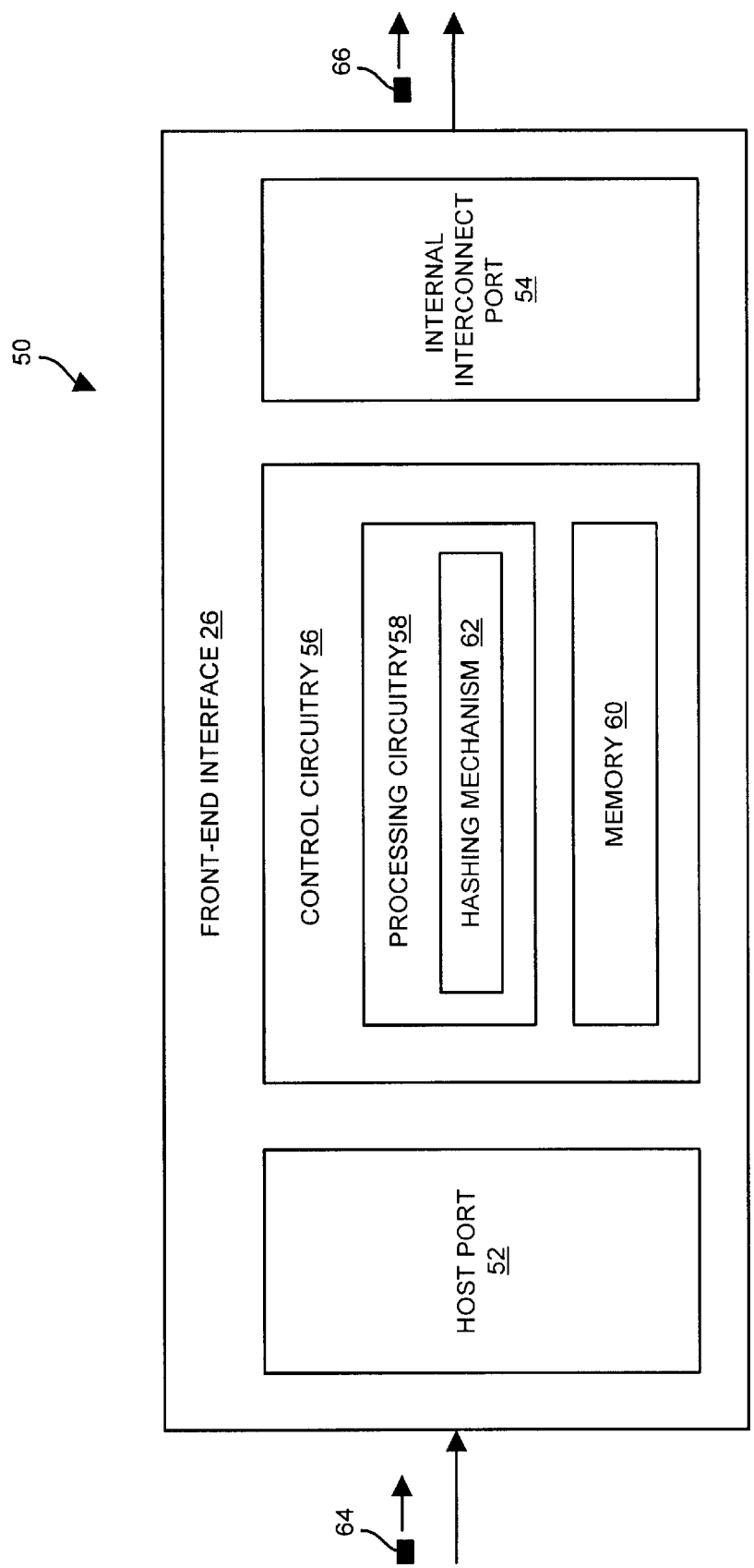
FIG. 2 is a block diagram of a front-end interface of a data storage system of the data storage system configuration of FIG. 1.

FIG. 2 is a block diagram 50 of a front-end interface 26 of the data storage system 22. The front-end interface 26 includes a host port 52, an internal interconnect port 54 and control circuitry 56. The host port 52 is configured to connect with the external device 24 (see FIG. 1). Similarly, the internal interconnect port 54 is configured to connect with the other data storage system components, e.g., with the memory circuit boards 28, through the interconnection mechanism 33.

As shown in FIG. 2, the control circuitry 56 includes processing circuitry 58 and memory 60. The processing circuitry 58 includes a hashing mechanism 62 (e.g., logic) configured to perform a hash function. When the external device 24 sends a request 64 to the data storage system 22 requesting a data element 40, the processing circuitry 58 receives the request 64 through the host port 52 and applies the hash function on a disk address contained within the request 64. That is, the hashing mechanism 62 generates a hash pointer (or key) based on the disk address. By way of example only, the following equation illustrates this hashing operation:

$$\text{hash pointer} = H\,(DDCCHH),$$

where H is the hash function, and DDCCHH is the disk address obtained from the request 64 from the external device. In one arrangement, the disk address includes a disk identifier DD, a cylinder identifier CC and a head identifier HH, and application of the hash function generates the hash pointer by (i) forming a base address (e.g., based on the disk identifier DD) and (ii) adding an offset (e.g., based on the cylinder identifier CC). For example, the processing circuitry 58 forms the hash pointer by simply truncating the head identifier HH from the disk address. In such a situation, the disk identifier DD is essentially the base address, and the cylinder identifier CC is the offset. In another arrangements, more complex hash functions are used to improve distribution (e.g., to better randomize hash list selection).

After the processing circuitry 58 generates the hash pointer, the processing circuitry 58 then provides a communication 66 including a search command, the generated hash pointer and the disk address to the set of memory circuit boards 28 (e.g., a particular memory circuit board 28 based on the hash pointer) through the internal interconnect port 54. In one arrangement, the processing circuitry 58 includes a processor that executes instructions stored in the memory 60 in order to perform the hash function. Such an arrangement provides flexibility (e.g., ease in modifying the hash function, reconfiguring and upgrading). Further details of the invention will now be provided with reference to FIG. 3.

Figure 3:
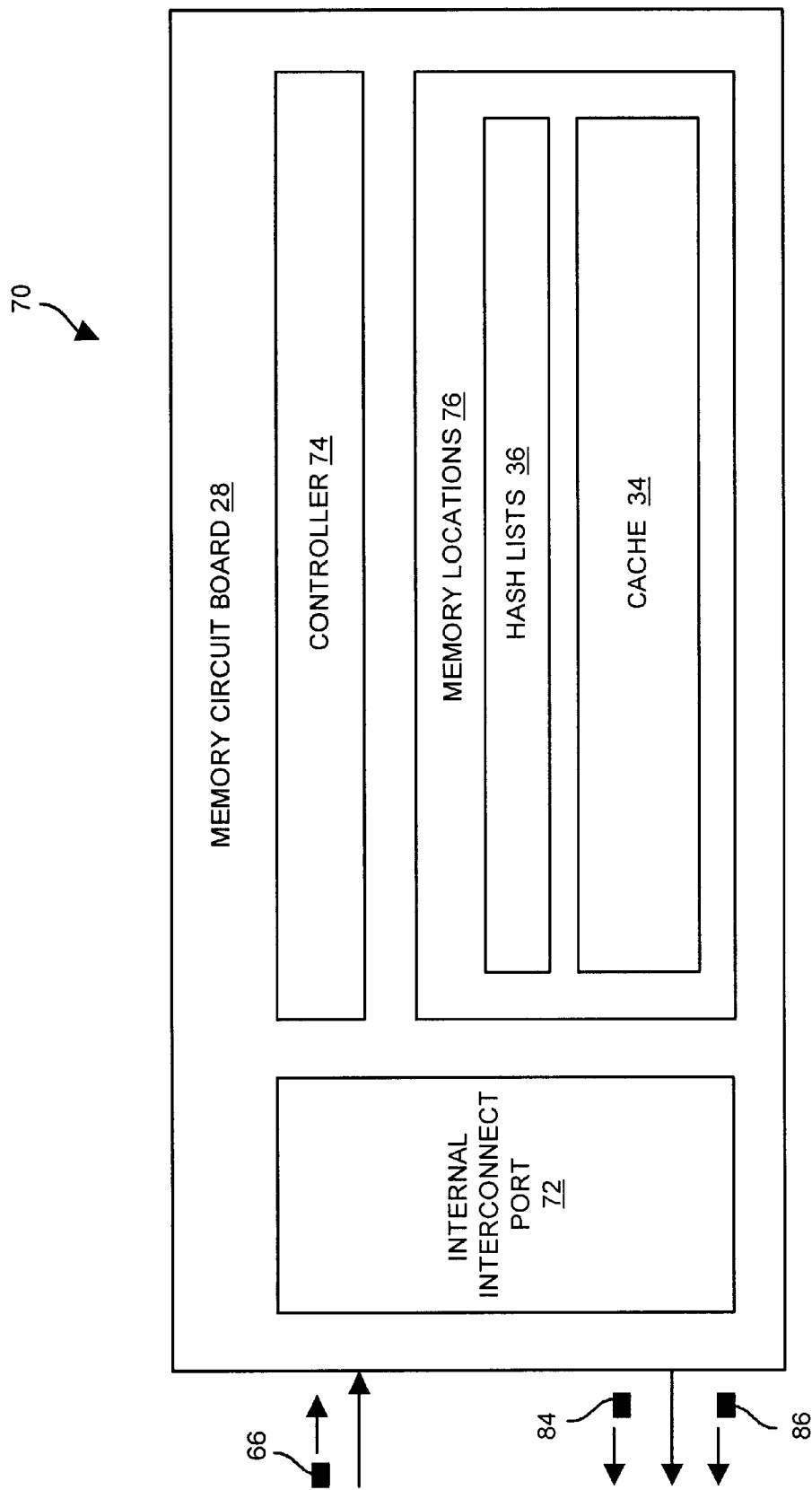
FIG. 3 is a block diagram of a memory circuit board of the data storage system of FIG. 1.

FIG. 3 is a block diagram 70 of a memory circuit board 28 of the data storage system 22. The memory circuit board 28 includes an internal interconnect port 72, a controller 74 and memory locations 76. By way of example only, the memory locations 76 store the set of hash lists 36 and the cache 34. In other arrangements, the set of hash lists 36 and the cache 34 are distributed among multiple memory circuit boards 28 so that each memory circuit board 28 stores only a portion of the set of hash lists 36 and a portion of the cache 34. In one arrangement, all of the hash lists 36 reside on one memory circuit board 28.

During operation, the controller 74 of the memory circuit board 28 receives the communication 66 containing the search command, the generated hash pointer and the disk address from the front-end interface 26 through the internal interconnect port 72. The controller 74 then searches the set of hash lists 36 based on the search command, the hash pointer and the disk address. If the controller 74 finds, in the set of hash lists 36, an entry 92 corresponding to a cache location 44 (also see FIG. 1) in the cache 34 (e.g., a cache slot), the controller 74 provides a communication 84 to the front-end interface 26 containing an indication that a copy of the data element 40 requested by the external device 24 resides in the cache 34. A pointer to where the data element 40 is in the cache 34 can be the indication itself, or can be included with the indication. However, if the controller 74 does not find such an entry, the controller 74 provides the communication 84 containing an indication that a copy of the data element 40 does not reside in the cache 34. In one arrangement, the controller 74 further provides a request 86 to the back-end interface 30 requesting that the back-end interface 30 provide the data element 40 to the cache 34 for subsequent transmission to the front-end interface 26. In an alternative arrangement, the front-end interface 26 requests the data element 40 from the back-end interface 30. Further details of the invention will now be provided with reference to FIG. 4.

Figure 4:
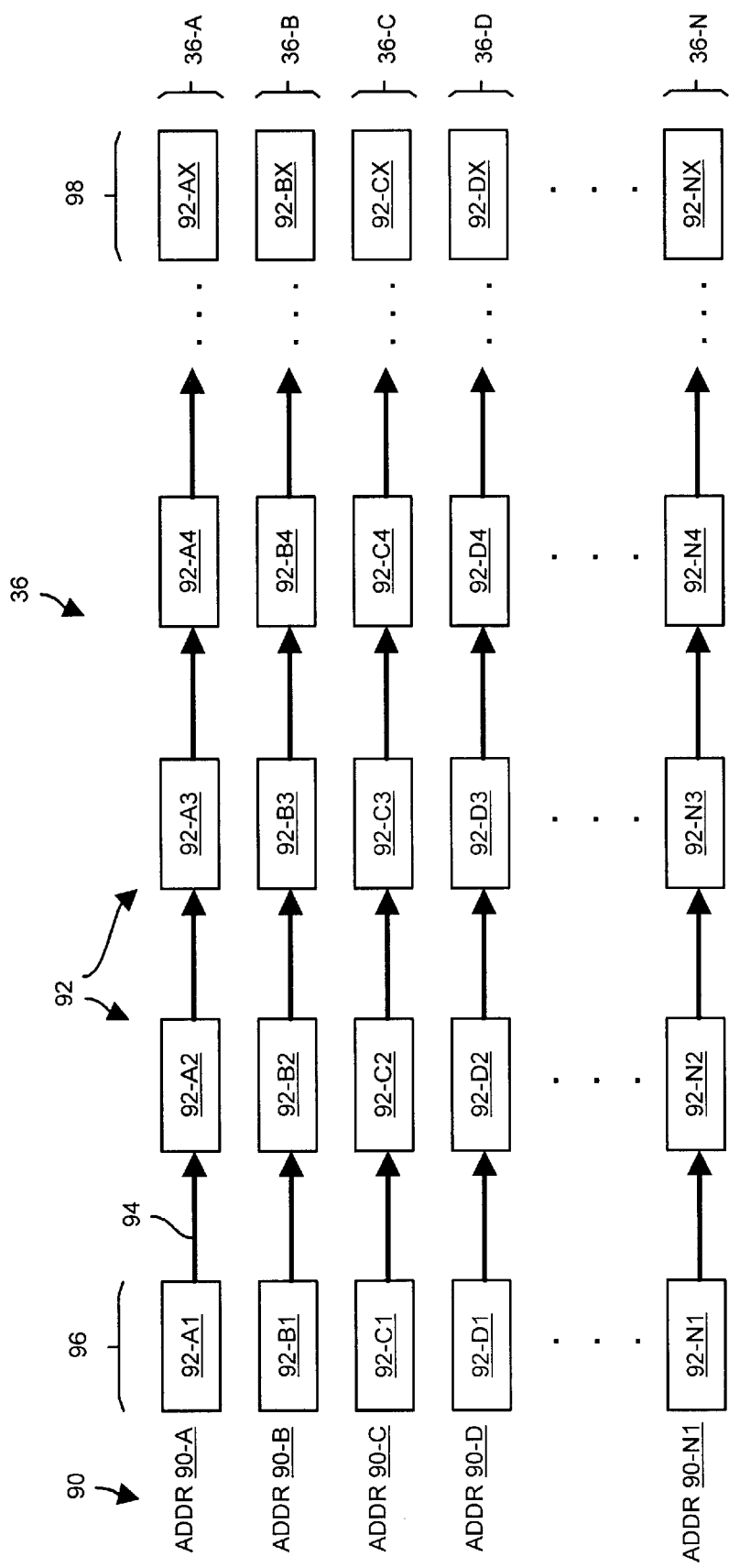
FIG. 4 is a block diagram of a set of hash lists used by the data storage system of FIG. 1.

FIG. 4 is a block diagram of the set of hash lists 36 after the data storage system 22 has been in operation for a period of time. By way of example only, the set of hash lists 36 includes N hash lists 36-A, . . . , 36-N (generally, hash lists 36). Each hash list 36 includes a set of entries 92. For example, the hash list 36-A includes a set of entries 92-A1, . . . , 92-AX. Similarly, the hash list 36-B includes a set of entries 92-B1, . . . , 92-BX, and so on. Each entry 92 corresponds to a particular cache location 44 (i.e., a cache slot, see FIG. 1) which is capable of storing a copy of a data element 40 in the set of storage devices 32 (again, see FIG. 1).

As shown in FIG. 4, the set of hash lists 36 are selectable (i.e., individually identifiable and addressable) by addresses 90-A, . . . , 90-N (collectively, addresses 90). For example, the hash list 36-A can be referenced using the address 90-A. Similarly, the hash list 36-B can be referenced using the address 90-B, and so on. In one arrangement, the hash pointers generated by the hash function performed by the front-end interfaces 26 are the addresses 90. In another arrangement, the hash pointers point to other locations containing the addresses 90 thus enabling the controller 74 to reference at least some of the entries 92 using an indirect addressing scheme. As will be explained later, the controller 74 uses hash pointers generated by the front-end interface 26 to select hash lists 36 from the set of hash lists 36 when searching the set of hash lists 36 for entries 92 corresponding to cache locations 44 containing copies 42 of requested data elements.

As further shown in FIG. 4, the entries 92 of each hash list 36 have a particular order. In one arrangement, the entries 92 for each hash list are scattered arbitrarily within a range of contiguous memory locations 76 of the memory circuit board 28 (also see FIG. 3), and ordered using pointers 94 (see the thicker arrows 94 in FIG. 4) thus forming a set of linked list data structures. In this linked list arrangement, each hash list 36 includes an entry 92 at a head 96 of the link list data structure (e.g., head entry 92-A1) and a tail 98 of the linked list data structure (e.g., tail entry 92-AX). Further details of the invention will now be provided with reference to FIG. 5.

Figure 5:
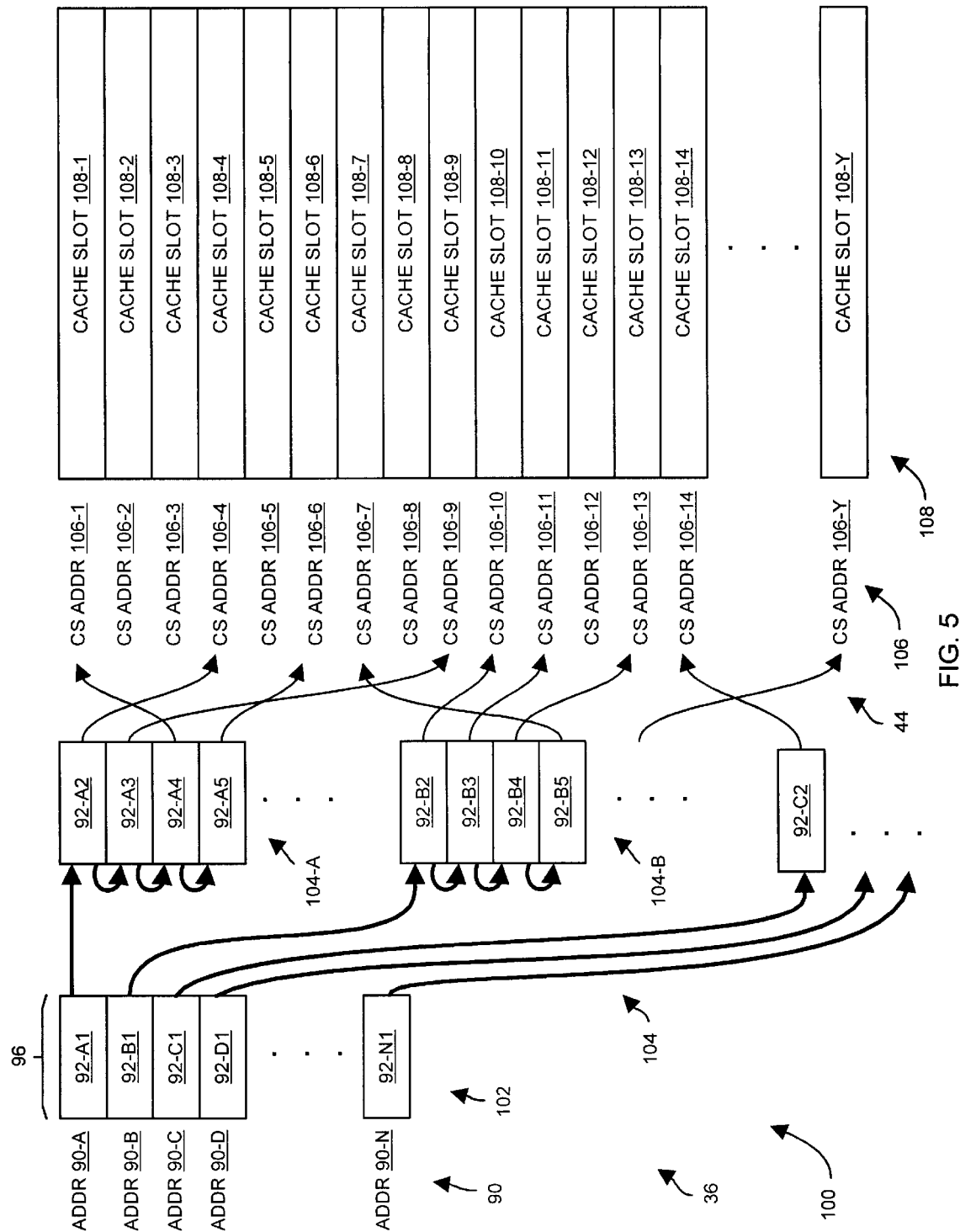
FIG. 5 is a logical view of the set of hash lists of FIG. 4.

FIG. 5 is a logical view 100 of the set of hash lists 36 of FIG. 4. In the logical view 100, the head entries 92-A1, . . . , 92-N1 (i.e., heads 96 of the set of hash lists 36, also see FIG. 4) form a list of head entries 102. The remaining portion of each hash list 36 forms a respective secondary list 104. For example, the remaining portion of the hash list 36-A forms a secondary list 104-A including entries 92-A2, 92-A3, . . . . Similarly, the remaining portion of the hash list 36-B forms a secondary list 104-B including entries 92-B2, 92-B3, . . . , and so on.

Recall that the each hash list 36 (e.g., the hash list 36-A1, . . . , 36-AX, also see FIG. 4) is a linked list data structure as illustrated by the thick arrows representing links between entries 92. Also, recall that each entry 92 corresponds to a location 44 in the cache 34. That is, each entry 92 in the set of hash lists 36 includes a field containing a pointer to an cache slot address 106 of a cache slot 108, as shown by the thinner arrows in FIG. 5. For example, the entry 92-A2 includes a field containing the cache slot address 106-4. Accordingly, the entry 92-A2 corresponds to the cache slot 108-4. As such, the hash list configuration is essentially an X-way hashing scheme (and an X-way cache 34) in which each generated hash pointer results in X possibilities, i.e., X entries one of which could result in a match. Each entry 92 of the head entry list 102 points to a cache slot 108 as well, although the thinner arrows from the entries 92 in the head entry list 102 are omitted in FIG. 5 for simplicity.

The set of hash lists 36 are depicted in the logical view 100 of FIG. 5 to illustrate how the controller 74 of the memory circuit board 28 traverses the set of hash lists 36 when determining whether a copy of a particular data element 40 resides in the cache 34 in accordance with an embodiment of the invention. When the memory circuit board 28 receives the communication 66 from the front-end interface 26 through the internal interconnect port 72 (see FIG. 3) in response to a request for the data element 40 from the external device 24, the controller 74 of the memory circuit board 28 searches the set of hash lists 36 based on the communication 66, i.e., based on the search command, the generated hash pointer and the disk address contained within the communication 66.

The search of the set of hash lists 36 occurs as follows. The controller 74 enters a search mode in response to the search command. The controller 74 then selects a hash list 36 from the set of hash lists 36 based on the generated hash pointer. In this particular embodiment the generated hash pointer is an address 90 of a head entry 92 in the head list 102. For example, suppose that the generated hash pointer is the address 90-B. The controller selects the hash list 36-B since the generated hash pointer references the first entry 92-B1 in the hash list 36-B. Next, the controller 74 searches the entries 92-B1, ..., 92-BX for an entry containing, in a disk address field, the disk address. During the search, the controller 74 inspects the entry 92-B1 (i.e., a head entry) looking to find a match between the disk address and the contents of the disk address field of the entry 92-B1. Suppose that no match is found. The controller 74 then inspects the next entry 92-B2 (i.e., the first entry in the secondary list 104-B). Suppose again that no match is found. The controller 74 continues to search subsequent entries 92-B3, ..., 92-BX until it finds a match.

Suppose that the controller 74 finds that the disk address matches the contents of the disk address field of the entry 92-B3. In response to detecting the match, the controller 74 concludes that a copy of the request data element 40 resides in the cache 34, namely in the cache slot 108-11 which corresponds to the entry 92-B3 (i.e., the entry 92-B3 includes the cache slot address 106-11 that references the cache slot 108-11). Since the controller 74 determines that a copy of the requested data element 40 resides in the cache 34, the controller 74 provides, to the front-end interface 26, the communication 84 (see FIG. 3) containing an indication that the copy of the data element 40 resides in the cache 34 at cache slot address 106-11.

Alternatively, suppose that the controller 74 traverses the entire hash list 36-B and does not find a match (i.e., the controller 74 reaches the end of the secondary list 104-B without finding a match). The end of the hash list 36-B can be identified in a conventional manner (e.g., the last entry 92-BX can include a next entry pointer that is self-referencing, the last entry 92-BX can include a NULL pointer as a next entry pointer, etc.). At this point, the controller 74 determines that a copy of the requested data element 40 does not reside in the cache 34. Accordingly, the controller 74 sends a communication 84 containing an indication that a copy of the data element 40 does not reside in the cache 34. In one arrangement, the controller 74 further provides a request 86 (FIG. 3) to the back-end interface 30 requesting that the back-end interface 30 provide the data element 40 to the cache 34 for subsequent transmission to the front-end interface 26.

It should be understood that the controller 74 needs to search at most the entire hash list 36-B rather than every entry 92 of the set of hash lists 36 when determining whether a copy of the requested data element 40 resides in the cache 34. Accordingly, the response time for determining whether the data element 40 resides in the cache is substantially shorter than an approach that requires searching of every entry in a single list of entries that corresponds to the entire cache.

Furthermore, it should be understood that the maximum number of entries 92 in the set of hash lists 36 can be limited to the number of cache slots 108 in the cache 34. In such a situation, when the cache 34 is completely full (i.e., is saturated with copies of data elements 40), the set of hash lists 36 contains the same number of entries 92 as there are cache slots 108. Accordingly, the set of hash lists 36 scales to the size of the cache 34 rather than the storage capacity of the set of disk drives 32. Further details of the invention will now be provided with reference to FIG. 6.

Figure 6:
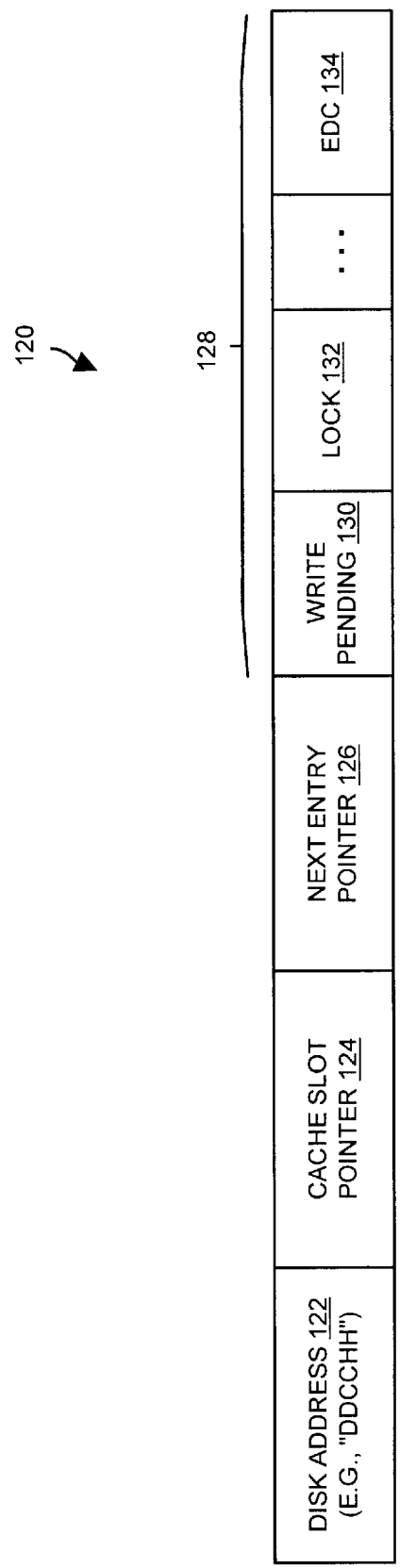
FIG. 6 is a block diagram of a format which is suitable for use by each entry of the set of hash lists of FIG. 4.

FIG. 6 is a block diagram of a format 120 which is suitable for use by each entry 92 of the set of hash lists 36 of FIG. 4. The format 120 includes a disk address field 122, a cache slot pointer field 124, a next entry pointer field 126, and additional fields 128. The disk address field 122 is configured to contain a disk address that uniquely identifies a set of locations on the set of disk drives 32 that contains a data element 40, e.g., a disk identifier DD, a cylinder identifier CC and a head identifier HH. The cache slot pointer 124 is configured to contain a cache slot address 106 (FIG. 5) which identifies a corresponding cache slot 108 that contains a copy 42 of the data element 40. The next entry pointer field 126 is configured to contain a pointer to the next entry 92 of a hash list 36 in order to form, as the hash list 36, a linked list data structure (e.g., or a self-referencing or NULL pointer if it is the tail entry 92 of the hash list 36).

The additional fields 128 can include control and status fields such as a write pending field 130 that indicates whether data in the cache slot 108 corresponding the entry 92 requires synchronization with the set of disk drives 32 (i.e., whether the data element is dirty). For example, if the data in the cache slot 108-11 is modified, the write pending field 130 of the entry 92-B3 for the cache slot 108-11 should have its contents set to indicate that it must be written to the set of disk drives 32.

As another example, the additional fields 128 can include a lock field 132 to indicate whether the associated cache slot 108 (i.e., the cache slot pointed to by the contents of the cache slot pointer field 124) is unlocked (e.g., accessible, writable, etc.) or locked for use.

As yet another example, the additional fields 128 can include a CRC field 134 for storing error detection or error correction information (e.g., a CRC code). Other fields are suitable for use as well such as status fields, tags, source information, etc. In some arrangements, the additional fields 128 includes the requested data element 40 in response to a successful match. Further details of the invention will now be provided with reference to FIG. 7.

Figure 7:
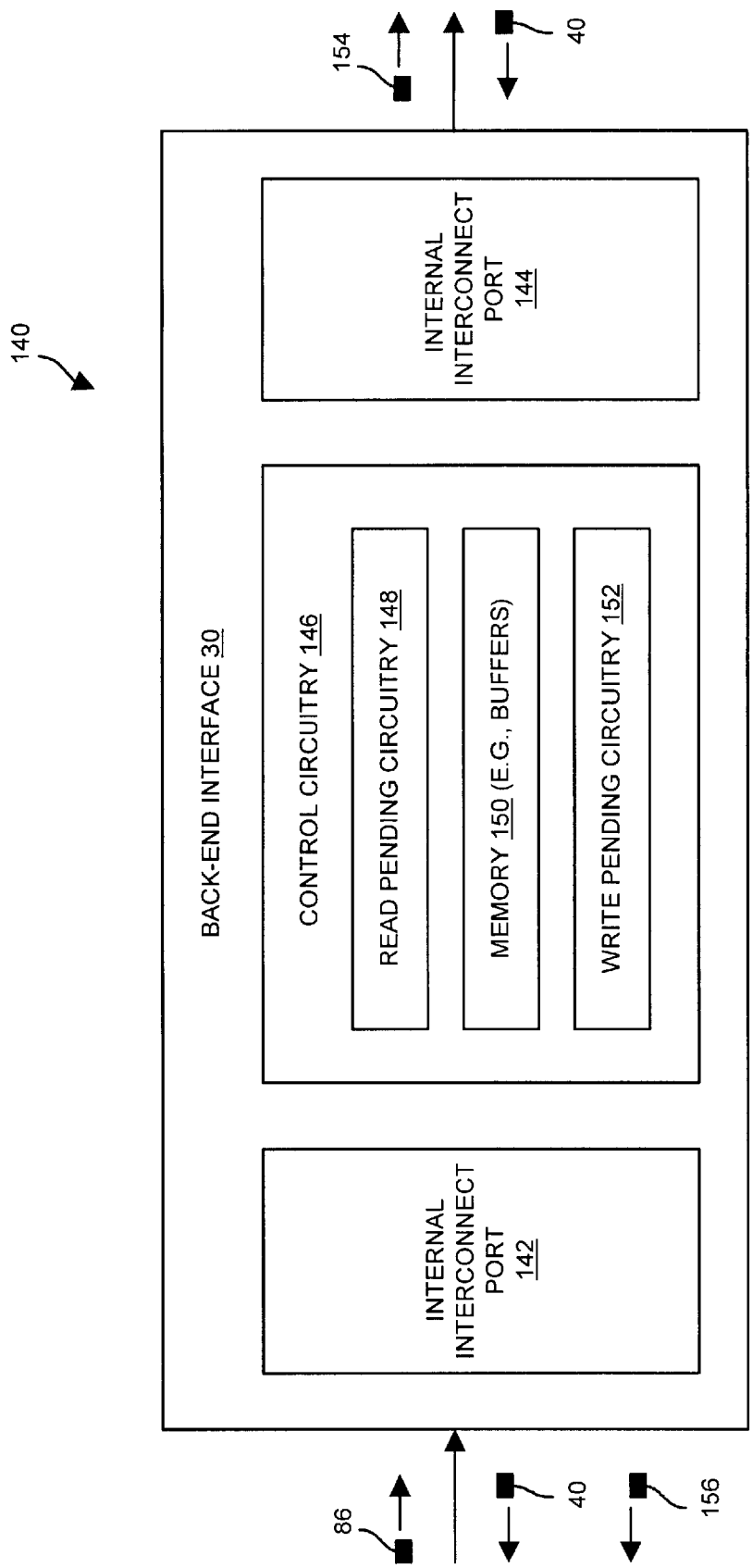
FIG. 7 is a block diagram of a back-end interface of the data storage system of FIG. 1.

FIG. 7 shows a block diagram 140 of a back-end interface 30. The back-end interface 30 includes an internal interconnect port 142, a disk drive port 144, and control circuitry 146. The control circuitry 146 includes read pending circuitry 148, memory 150 and write pending circuitry 152. The internal interconnect port 142 is configured to connect with the other data storage system components, e.g., with the memory circuit boards 28 through the interconnection mechanism 33 (e.g., a backplane, also see FIG. 1). The disk drive port 144 is configured to connect with the set of disk drives 32. In one arrangement, the data storage system 22 includes multiple back-end interfaces 30 for increased throughput, and each back-end interface 30 connects to a particular disk drive 32 of the set of disk drives 32. In one arrangement, each disk drive 32 is multi-ported (e.g., dual ported) in order to connect to multiple back-end interfaces 30 to provide redundant paths to the disk drive 32 (i.e., for fault tolerance).

When a memory circuit board 28 sends the request 86 to the back-end interface 30 requesting that the back-end interface 30 provide a data element 40 to the cache 34 for subsequent transmission to the front-end interface 26, the control circuitry 146 receives the request 86 through the internal interconnect port 142 and handles the request 86. In particular, the read pending circuitry 148 provides a signal 154 to the set of disk drives 32 through the disk drive port 144 to retrieve the data element 40. The read pending circuitry 148 then receives the data element 40 through the disk drive port 144, temporarily buffers at least portions of the data element 40 in the memory 150 (e.g., to perform an error detection operation), and provides the data element 40 to the memory circuit board 28 through the internal interconnect port 142 so that a copy of the data element 40 can be stored in the cache 34. The control circuitry 146 also provides, to the memory circuit board 28, a communication 156 instructing the memory circuit board 28 to update the set of hash lists 36 to indicate that the copy of the data element 40 is now available in the cache 34.

Additionally, during normal operation of the back-end interface 30, the write pending circuitry 152 continuously (e.g., in a multiplexing manner with the read pending circuitry 148) monitors the entries 92 of the set of hash lists 36 for write pending entries 92, i.e., entries 92 corresponding to cache slots 108 containing copies of data elements to be written to disk. To this end, the write pending circuitry 152 traverses the hash lists 36 for entries 92 having a write pending field 130 (see FIG. 5) with a particular code (e.g., with a write pending bit set). In one arrangement, the write pending circuitry 152 performs write pending operations (i.e., copies data elements from the cache 34 to the disk drives 32) in a manner that attempts to avoid providing any particular hash list 36 with more than a predetermined number (e.g., four) of write pending entries 92 at any particular time. As such, it is unlikely that there will ever be a situation in which some hash lists 36 are saturated with dirty cache slots 108 while other hash lists 36 have many available (or non-dirty) cache slots 108.

Having thus described particular details of various components of the data storage system 22, further details of how the components operate together will now be provided with reference to FIGS. 8 through 15. The following explanation assumes that the set of memory circuit boards 28 includes a single front-end interface 26, a single memory circuit board 28 and a single back-end interface 30 for simplicity. However, it should be understood that, in some arrangements, (i) the set of memory circuit boards 28 includes multiple memory circuit boards 28 and (ii) the cache 34 and the set of hash lists 36 are distributed across the multiple memory circuit boards 28. It should be further understood that, in some arrangements, the set of front-end interfaces 26 includes multiple front-end interfaces 26 and the set of back-end interfaces 30 includes multiple back-end interfaces 30.

Figure 8:
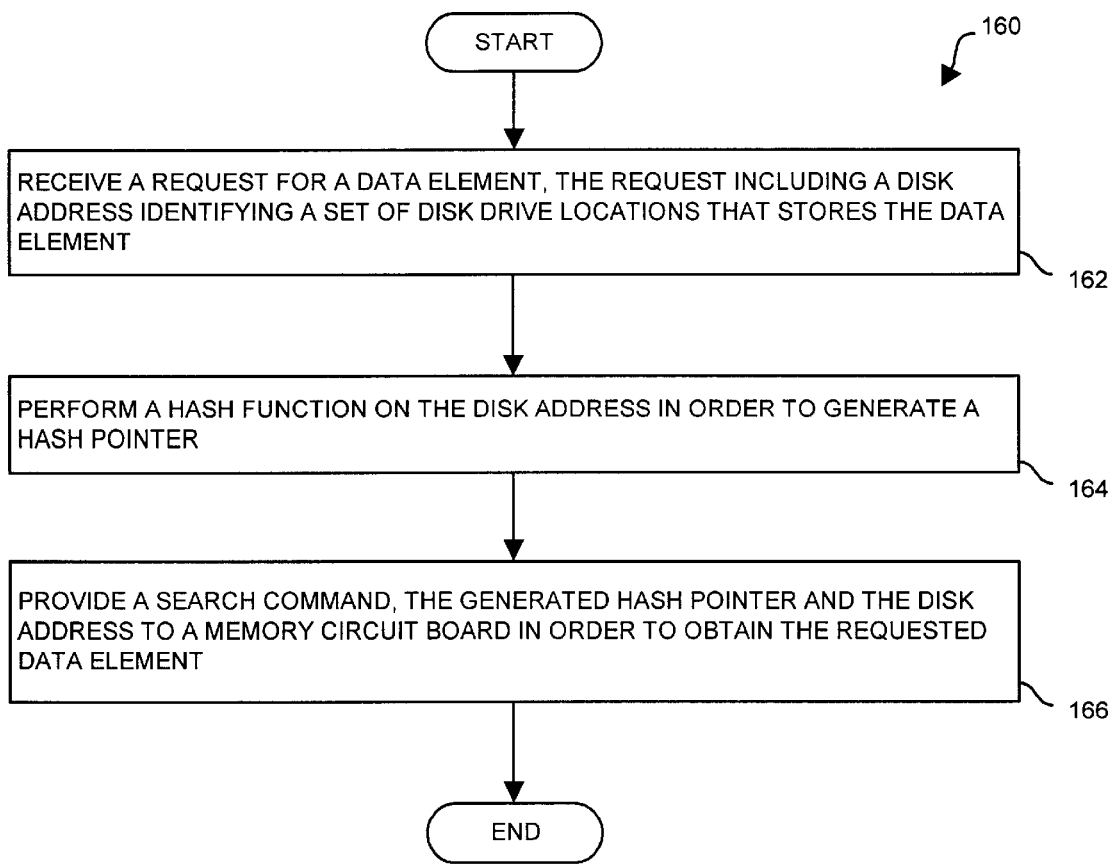
FIG. 8 is a flowchart of a procedure which is performed by the front-end interface of FIG. 2.

FIG. 8 shows a procedure 160 which is performed by the front-end interface 26 during operation. In step 162, the control circuitry 56 (FIG. 3) of the front-end interface 26 receives a request 64 for a data element 40 from the external device 24. The request 64 includes a disk address identifying a set of disk drive locations 38 of the set of disk drives 32 (FIG. 1) that store the data element 40.

In step 164, the control circuitry 56 of the front-end interface 26 performs a hash function on the disk address in order to generate a hash pointer. The hash function used is preferably one that results in selection of the hash lists 36 in fairly even manner. For example, if the set of memory circuit boards 28 are configured to use a set of hash lists 36 having 200 hash lists 36, application of the hash function to data element requests 64 preferably results in a fairly evenly distributed number of hits among the 200 hash lists 36. A poorly chosen hash function could result in particular hash lists 36 of the set of hash lists 36 consistently being selected more often than others.

In step 166, the control circuitry 56 of the front-end interface 26 provides a communication 66 including a search command, the generated hash pointer and the disk address to a memory circuit board 28 (FIG. 4) in order to obtain the requested data element 40.

Figure 9:
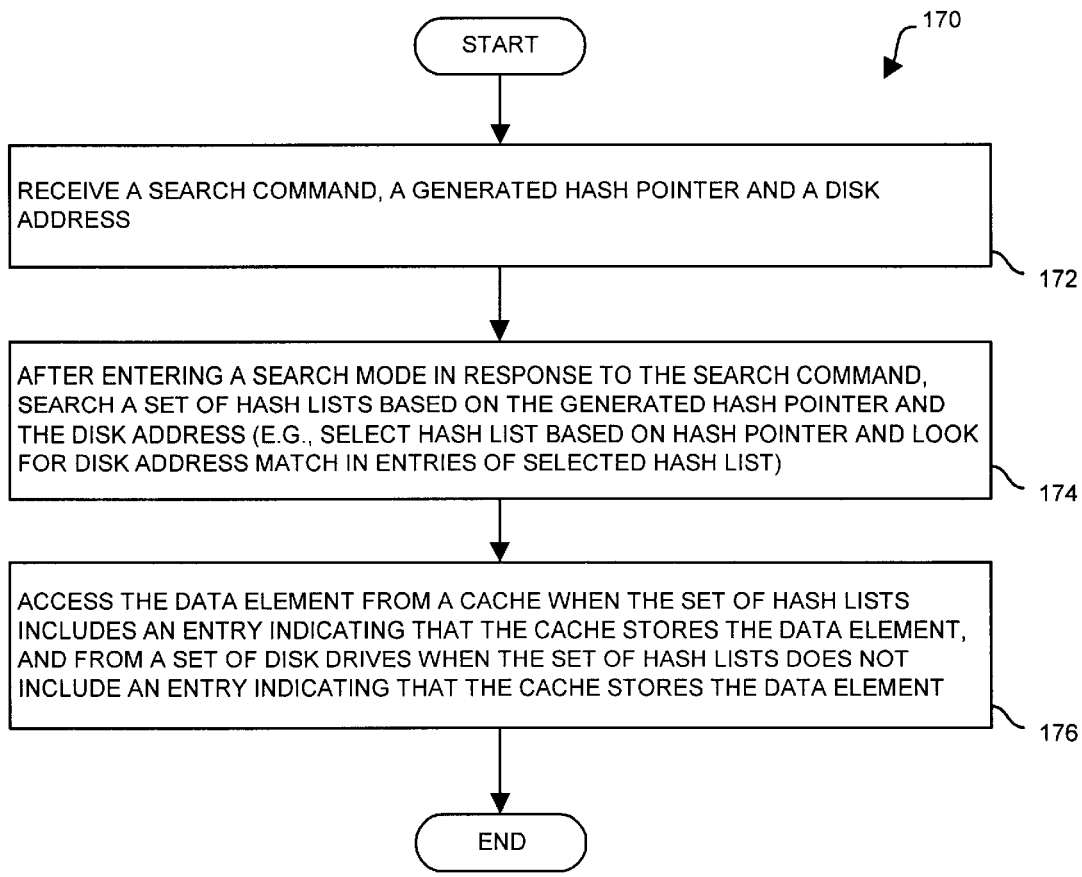
FIG. 9 is a flowchart of a procedure which is performed by the memory circuit board of FIG. 3.

FIG. 9 shows a procedure 170 which is performed by the memory circuit board 28 during operation. In step 172, the controller 74 (FIG. 4) of the memory circuit board 28 receives the communication 66 from the front-end interface 26. The communication 66 includes the search command, the generated hash pointer and the disk address.

In step 174, the controller 74 of the memory circuit board 28 enters a search mode in response to the search command, and searches the set of hash lists 36 based on the generated hash pointer and the disk address. In particular, the controller 74 selects a hash list 36 based on the generated hash pointer, and searches entries 92 of the selected hash list 36 for one containing a matching disk address (e.g., see the disk address field 122 of FIG. 6). In one embodiment, the generated hash pointer is an address of a head entry 92 (i.e., an entry in the head list 102, see FIG. 5), so that the selected hash list 36 is the hash list 36 having its head entry 92 referenced by the generated hash pointer. As mentioned above, the hash list selections preferably should be fairly evenly distributed across all of the hash lists 36 over time.

In step 176, the controller 74 of the memory circuit board 28 accesses the data element 40 from the cache 34 (FIG. 4) when the set of hash lists 36 includes an entry 92 indicating that the cache 34 stores a copy of the requested data element 40 (i.e., includes an entry 92 with contents of the disk address field 122 matching the disk address). In particular, the controller 74 sends a communication 84 to the front-end interface 26 indicating that a copy of the data element 40 is in the cache 34 and subsequently provides the copy of the data element 40 to the front-end interface 26. If the set of hash lists 36 does not include an entry 92 indicating that the cache 34 stores a copy of the requested data element 40, the memory circuit board 28 sends the communication 84 indicating that a copy of the data element 40 is not available in the cache 34 and then provides a request 86 to the back-end interface 30 requesting that the data element 40 be retrieved from the set of disk drives 32.

In response to a request 86 requesting that a data element 40 be retrieved from the set of disk drives 32, the back-end interface 30 retrieves the data element 40 and provides a copy of the data element 40 to the memory circuit board 28. Additionally, the back-end interface 30 sends the communication 156 to the memory circuit board 28 directing the memory circuit board 28 to update the set of hash lists 36 to reflect that a copy of the data element 40 is now available in the cache 108 at a particular location, i.e., a cache slot 108. Concurrently, the back-end interface 30 performs additionally procedures to maintain the cache 34 and the set of hash lists 36, as will now be described.

Figure 10:
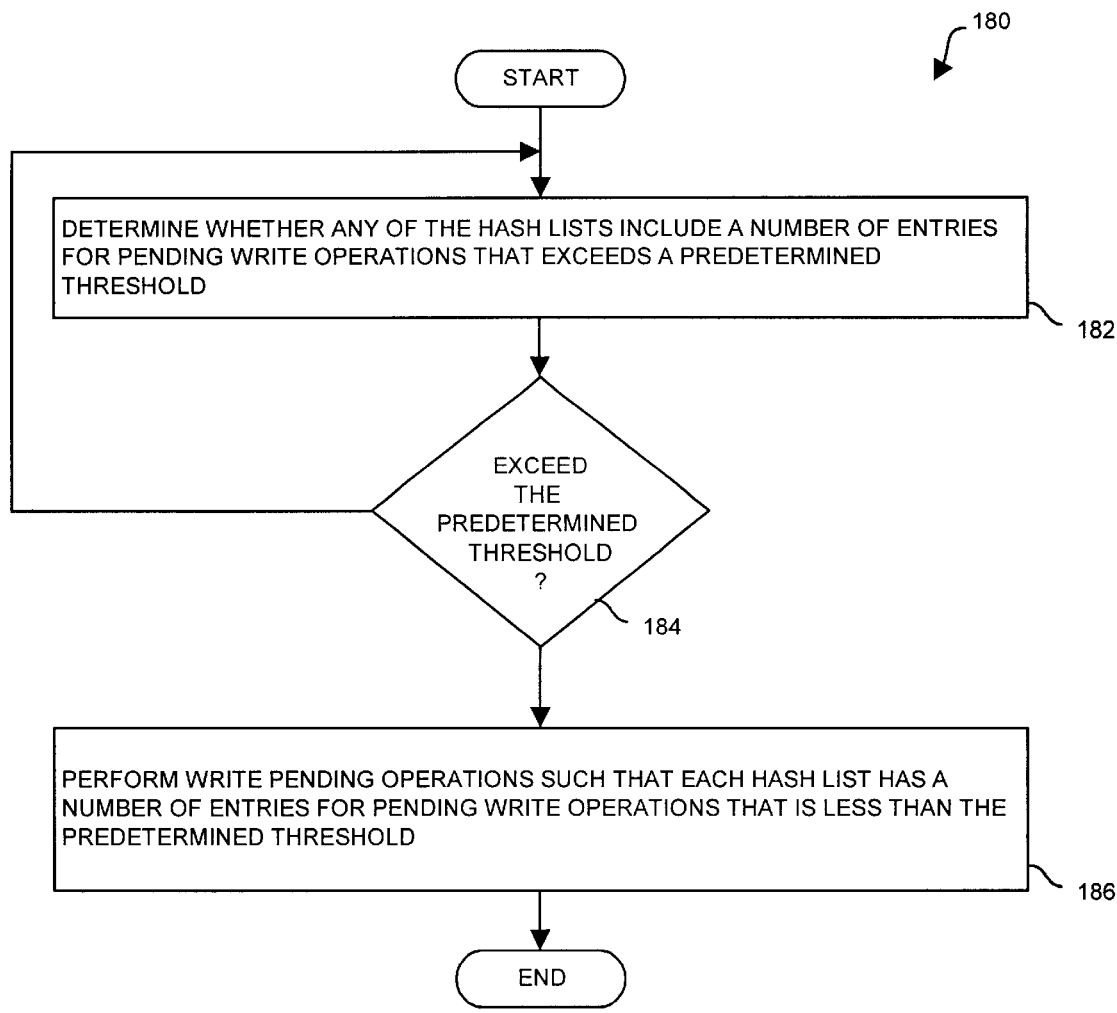
FIG. 10 is a flowchart of a procedure which is performed by the back-end interface of FIG. 7.

FIG. 10 shows a procedure 180 which is continuously performed by the back-end interface 30 during operation. In step 182, the control circuitry 146 of the back-end interface 30 (FIG. 7) determines whether any of the hash lists 36 include a number of entries 92 for pending write operations (i.e., dirty cache slots) that exceeds a predetermined threshold, i.e., a maximum number of write pending entries per hash list 36.

In step 184, if any hash lists 36 include more write pending entries 92 than the predetermined threshold, the controller 146 proceeds to step 184. Otherwise, the controller 146 returns to step 182.

In step 186, the controller 146 performs one or more write pending operations such that the number of entries 92 in each hash list 36 indicating a dirty cache slot 108 is less than the predetermined threshold. That is, the controller 146 of the back-end interface 30 transfers copies 42 of data elements from the cache 34 (also see FIG. 1) to the set of disk drives 32 in order to synchronize the set of disk drives 32 with the cache 34. Accordingly, the back-end interface 30 clears the cache 34 of dirty cache slots 108 thus freeing the cache 34 so that copies 42 of more data elements 40 can be written to the cache 34.

It should be understood that the set of memory circuit boards 28 are in charge of maintaining coherency of the set of hash lists 36. To this end, the memory circuit board 28 is capable of searching and/or modifying (e.g., adding an entry 92, deleting an entry 92, etc.) the set of hash lists 36. Preferably, the set of memory circuit boards 28 operate in accordance with a command syntax that includes the earlier-described search command. Other suitable commands include, among others, a SEARCH command for selecting and searching one of the hash lists 36, an ADD_ENTRY command for adding an entry 92 to a hash list 36, a REMOVE_ENTRY command for removing an entry 92 from a hash list 36, a READ_LIST command that reads an entire hash list 36, etc. Further details of the invention will now be provided with reference to FIGS. 11 through 15.

Figure 11:
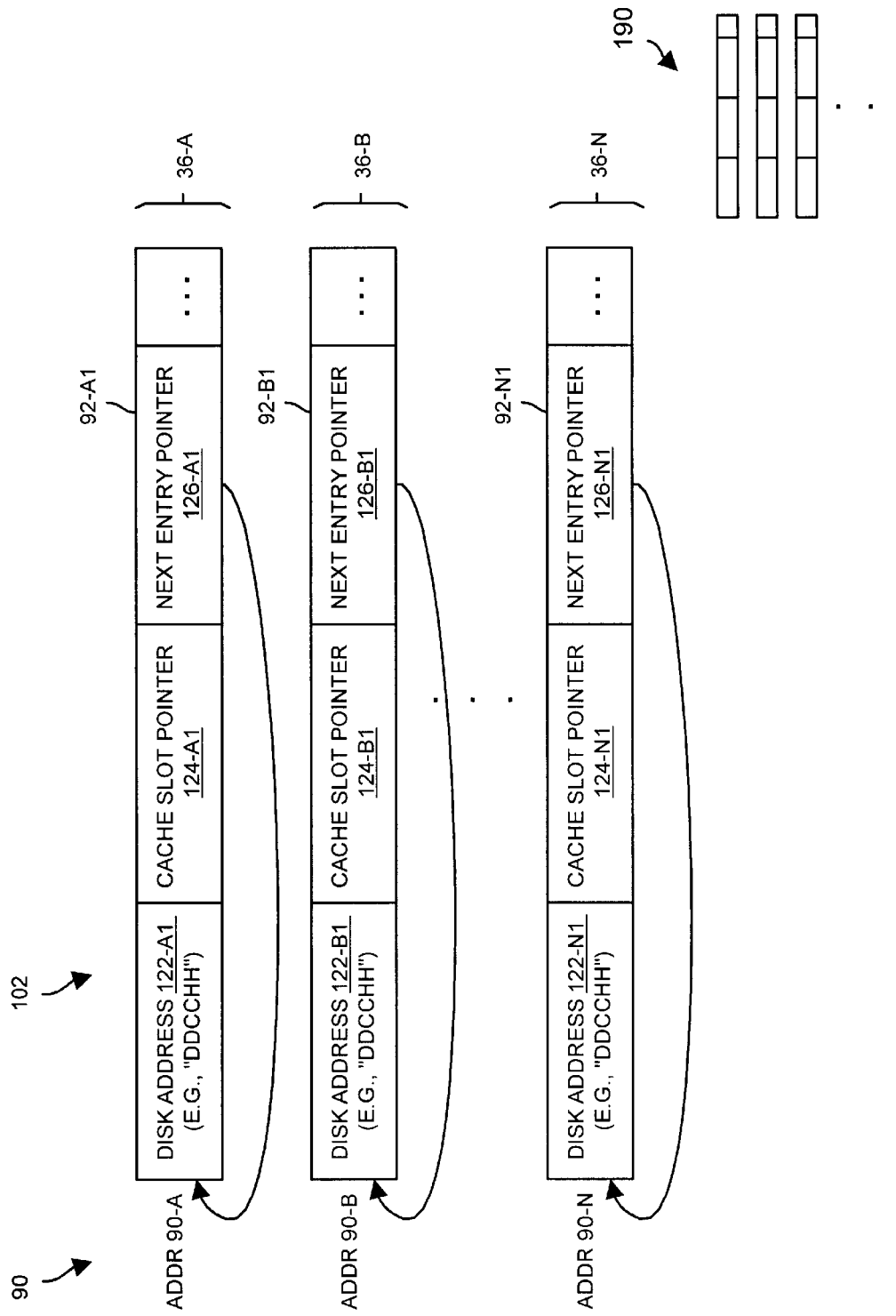
FIG. 11 is a block diagram of a set of hash lists used by the data storage system when the data storage system initially starts.

FIG. 11 shows the set of hash lists 36 when the data storage system 22 initially starts. At this time, the set of memory circuit boards 28 has set aside an amount of memory for the set of hash lists 36. Within this memory reside the list 102 of head entries 92 (also see FIG. 5). Each entry 92 in the head list 102 is initially empty. In particular, the disk address field 122 of each entry 92 is clear (e.g., set to zero or NULL), the cache slot pointer field 124 of each entry 92 is clear, and the next entry pointer field 126 indicates that the entry 92 is the only entry 92 in the hash list 36 (e.g., the next entry pointer field 126 includes is self-referencing, is NULL, etc.).

As time goes on, the entries 92 within the head list 102 can be set to indicate that a copy of a data element 40 resides in the cache 34. Furthermore, a pool 190 of available entries 92 reside in the memory which is set aside for the set of hash lists 36. Entries 92 from the pool 190 can be added (or deleted) to grow (or shrink) the set of hash lists 36.

For example, suppose that the external device 24 (FIG. 1) sends a request 64 for a data element 40 from the data storage system 22. The front-end interface 26 performs a hash function on the disk address within the request 66. Suppose that the hash pointer generated by the hash function is the address 90-B, i.e., the hash pointer points to the entry 92-B1 thus selecting the hash list 36-B. The front-end interface 26 sends a communication 66 including a search command, the generated hash pointer and the disk address to the memory circuit board 28. The memory circuit board 28 searches set of hash lists 36. In particular, the memory circuit board 28 selects the hash list 36-B because the generated hash pointer points to the head entry 92-B1 of the hash list 36-B. The controller 74 of the memory circuit board 28 determines that the disk address does not match the contents of the disk address field 122-B1 which is still clear after initialization. Additionally, the controller 74 determines that it has reached the end of the hash list 36-B because the next entry pointer field 126-B1 of the entry 92-B1 indicates that it is a tail (e.g., self-referencing as shown in FIG. 11). As a result, the controller 74 has traversed the entire selected hash list 36-B and not found an entry indicating that the requested data element 40 is stored in the cache 34. Accordingly, the controller 74 concludes that a copy of the data element 40 does not reside in the cache 34 and that the data element 40 must be retrieved from the set of disk drives, and sends the request 86 to the set of back-end interfaces 30 to retrieve the data element 40 from the set of disk drives 32, as described earlier.

Figure 12:
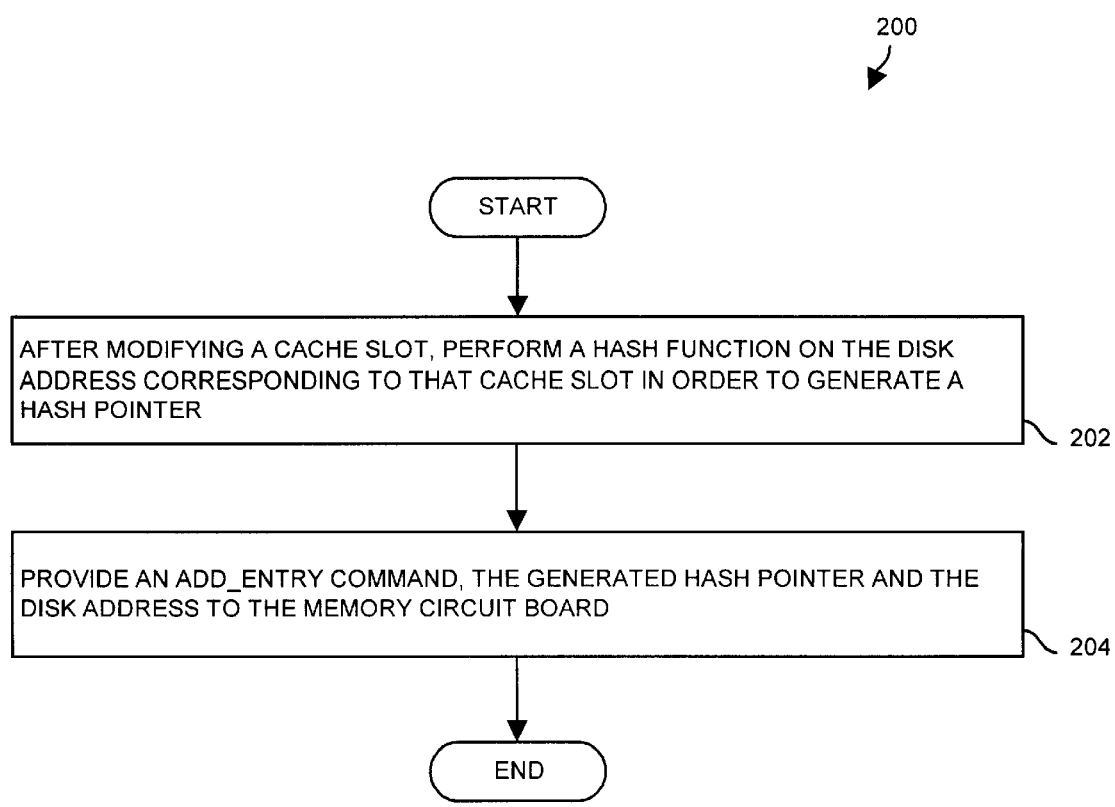
FIG. 12 is a flowchart of a procedure which is performed by the back-end interface of FIG. 7 when responding to a request for a data element.

FIG. 12 shows a procedure 200 which is performed by the back-end interface 30 when responding to the request 86 for the data element 40. In step 202, before one of the set of back-end interfaces 30 moves a copy of the requested data element 40 into a cache slot 108 of the cache 34, that back-end interface 30 performs a hash function on the disk address corresponding to that cache slot 108 in order to generate the hash pointer 90-B. In step 204, the back-end interface 30 provides a communication 156 including an ADD_ENTRY command to add an entry 92 to the set of hash lists 36 indicating that the copy of the data element 40 is now in the cache 34, the generated hash pointer and the disk address.

Figure 13:
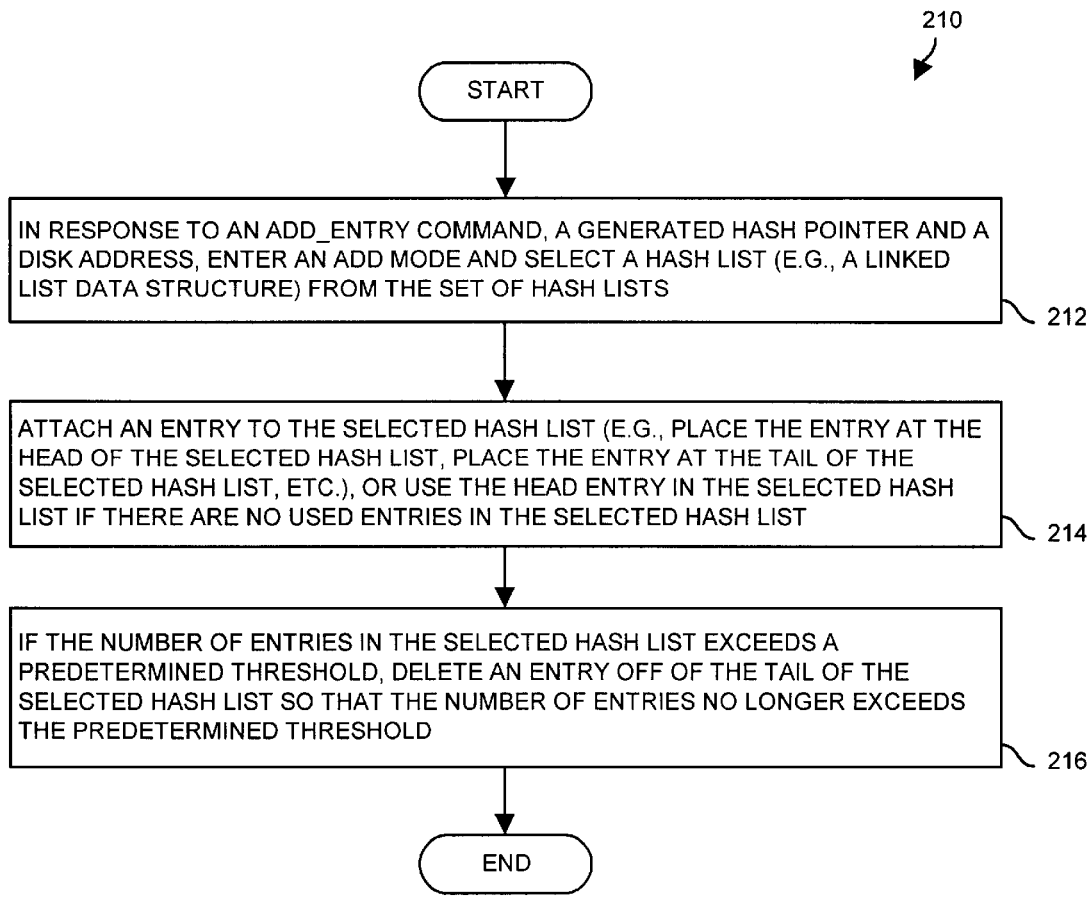
FIG. 13 is a flowchart of a procedure which is performed by a set of memory circuit boards in response to a communication from the back-end interface of FIG. 7.

FIG. 13 shows a procedure 210 which is performed by the set of memory circuit boards 28 in response to the communication 156 provided by the back-end interface 30. In step 212, the controller 74 of one of the memory circuit boards 28 enters an add mode for adding an entry 92 and selects one of the set of hash lists 36 based on the generated hash pointer. Since the generated hash pointer is the address 90-B for the head entry 92-B1, the controller 74 selects the hash list 36-B (see FIG. 11).

In step 214, the controller 74 either (i) attaches a new entry 92 to the selected hash list 36-B if the selected hash list 36-B already uses at least one entry 92, or uses the head entry of the selected hash list if no entries 92 are being used. Since there are no entries 92 of the hash list 36-B presently being used, the controller 74 simply updates the entry 92-B1. In particular, the controller 74 sets the contents of the disk address field 122-B1 to the disk address (e.g., to include the particular disk, cylinder and head identifiers where the data element 40 can be found in the set of disk drives 32). Additionally, the controller 74 sets the contents of the cache slot pointer field 124-B1 to point to the cache slot 108 containing the copy of the moved data element 40. The controller 74 allows the next entry pointer field 126-B1 to continue to indicate that it is the tail entry of the hash list 36-B since it is the only entry 92 of the hash list 36-B. Furthermore, the controller 74 updates the other fields of the entry 92-B1 (e.g., the remaining control and status fields).

In step 216, the controller 74 verifies that the number of entries 92 in the selected hash list 36-B is below a predetermined threshold. If the number of entries 92 in the selected hash list 36-B is not below the predetermined threshold, the controller 74 deletes an entry 92 from the selected hash list 36-B. Accordingly, the controller 74 prevents the selected hash list 36-B from becoming excessively long which would result in longer searches. The predetermined threshold limiting the length of the hash lists 36 is higher than the predetermined threshold limiting the number of write pending entries 92 in the hash lists 36 thus ensuring that the memory circuit board 28 can always find a entry 92 to delete that points to a non-dirty (i.e., synchronized) copy 44 of a data element 40 in the set of disk drives 32. Accordingly, those data elements 40 can still be retrieved from the set of disk drives 32.

It should be understood that, as the data storage system 22 continues operation, other entries 92 of the set of hash lists 36 will be added and modified. In particular, as copies 42 of new data elements 40 are moved from the set of disk drives 32, the set of memory circuit boards 28 will select some of the other hash lists 36 and initially use the head entries 92 of those other hash lists 36.

Also, after the head entries 92 of each hash list 36 is used, the set of memory circuit boards 28 will add entries 92 to the hash lists 36. For example, suppose that the set of back-end interfaces 30 moves a copy of another data element 40 from the set of storage devices 32 into the cache 34, and that the hash function on the disk address for that data element 40 is the address identifying the entry 92-B1 so that the selected hash list is the hash list 36-B. The controller 74 of the memory circuit board 28 can simply retrieve an unused entry 92 from the pool 190 of entries (FIG. 11), and add that entry 92 to the end of the hash list 36-B. That is, the controller 74 updates the appropriate fields of the entry 92-B2 to correspond to the cache slot 108 holding the copy of the data element 40, and sets the next pointer field 126-B1 of the entry 92-B1 to point to the entry 92-B2.

Figure 14:
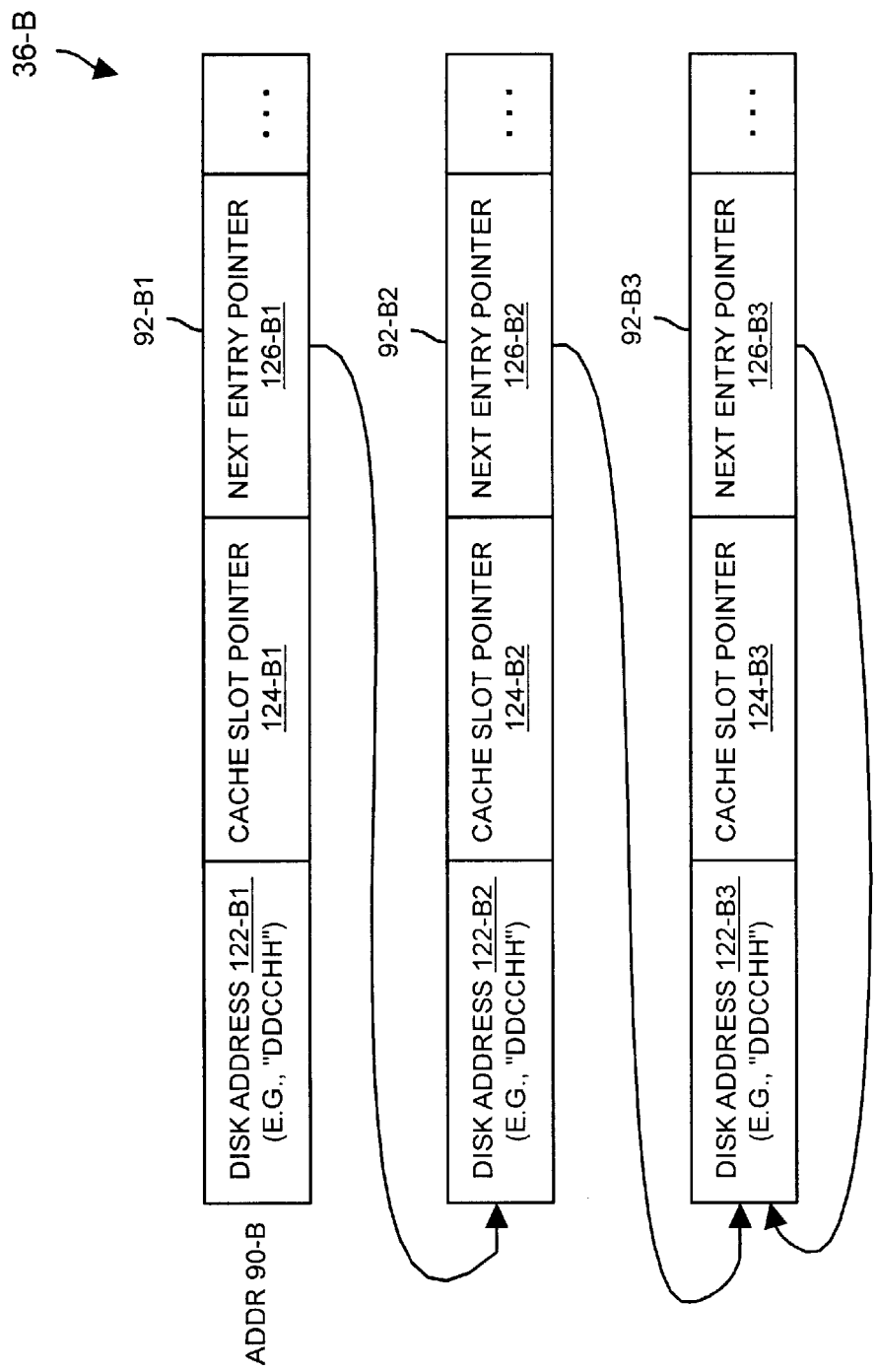
FIG. 14 is a block diagram of a hash list after a controller of a memory circuit board has added entries.

FIG. 14 shows the hash list 36-B after the controller 74 of the memory circuit board 28 adds an entry 92-B2 after the entry 92-B1, and subsequently adds another entry 92-B3 after the entry 92-B2. The controller 74 can determine that the entry 92-B3 is the last entry 92 in the hash list 36-B because the next pointer field 126-B3 of the entry 92-B3 is self-referencing.

As the data storage system 22 continues operation, the components 26, 28, 30 continue to fill the cache 34 with copies of data elements 40 and the set of hash lists 36 with new entries 92 to reflect the changes in the cache 34. The memory circuit board 28 is configured not to allow the lengths of the hash lists 36 to exceed a predetermined number of entries 92 (i.e., a predetermined threshold or maximum) in order to maintain acceptable response times (e.g., while searching a hash list 36). Over time, some entries 92 of the set of hash lists 36 will indicate that a write operation must be performed in order to synchronize the cache 34 with the set of disk drives 32 (e.g., by setting a write pending field 130 in those entries 92. The back-end interface 30 attempts to handle the write operations so that none of the hash lists 36 has more than a predetermined amount or limit of entries 92 requiring a write operation. This predetermined limit to the number of write pending entries 92 allowed in each hash list 36 is lower than the maximum number of entries 92 permitted for each hash list 36 so that there is always at least one non-dirty entry 92 that can be deleted.

It should be understood that the order of steps 214 and 216 in the procedure 210 of FIG. 13 can be reversed so that an entry 92 is deleted from a hash list 36, if necessary, prior to adding a new entry 92 to the hash list 36. Accordingly, a maximum amount of memory used by the set of hash lists 36 (e.g., when each hash list has the maximum number of entries 92) will never be exceeded. Further details of the invention will now be provided with reference to FIG. 15.

Figure 15:
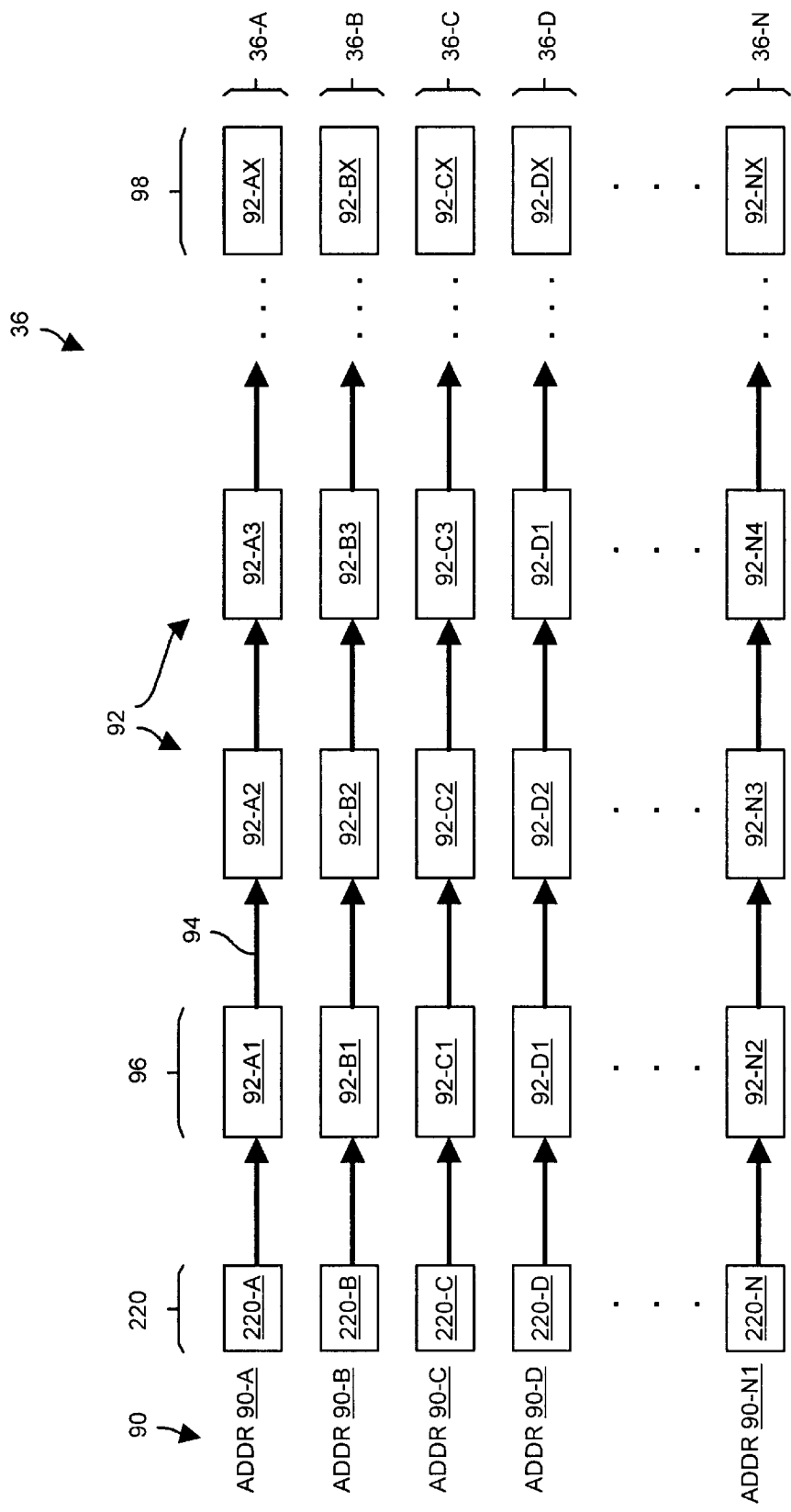
FIG. 15 is a block diagram of a set of hash lists when utilizing indirect addressing in order to add entries to the heads of the hash lists.

FIG. 15 shows the set of hash lists 36 according to an embodiment of the invention in which the memory circuit board accesses the set of hash tables 36 using indirect addressing and in which the entries 92 are added to the heads of the hash lists 36 and deleted from the tails of the hash lists 36. Accordingly, the newer entries 92 are at the fronts of the hash lists 36 and the older entries are at the ends of the hash lists 36.

As shown, each generated hash pointer resulting from performing the hash function (e.g., either in the front-end interface 26 or the back-end interface 30) points to a memory location 220 rather than directly to an entry 92. The contents of the memory locations 220 point to the head entries 92 in the hash lists 36. In this embodiment, when the memory circuit board 28 responds to a SEARCH command, a generated hash pointer and a disk address, the memory circuit board 28 selects a hash list 36 from the set of hash lists 36 using indirect addressing. In particular, the memory circuit board 28 obtains a second address from a memory location 220 referenced by the generated hash pointer. That second address points to the head entry 92 of a selected hash list 36. The memory circuit board 28 then accesses the selected hash list in the manner described above.

It should be understood that, in the above-described embodiment in which new entries 92 are added (i.e., inserted) at the beginning of each hash list 36 and deleted from the end of each hash list 36, the head entry 92 of each hash list constantly changes, i.e., grows older. Accordingly, the deleted entries 92 tend to correspond to the oldest non-dirty copies 42 of data elements 40 and tend to be the least likely to be re-accessed in many types of data storage applications.

In some arrangements, one or more of the above-described commands is carried out by programming the memory circuit board 28 using a SCRIPT command. In these arrangements, an interface circuit board 26, 30 provides a communication to the memory circuit board 28. The communication includes a SCRIPT command and a payload containing a series of individual instructions (rather than, or in combination with data). The memory circuit board 28 then performs a series of operations (e.g., operations that access the set of hash lists 36) based on the series of individual instructions. Similar tasks are described in a copending U.S. Patent Application filed on even date herewith and entitled "A DATA STORAGE SYSTEM HAVING AN IMPROVED MEMORY CIRCUIT BOARD," by the same inventor as in the present application and assigned to the same assignee as the present application, the teachings of which are hereby incorporated by reference in their entirety.

Furthermore, in some arrangements, the data storage system components 26, 28, 30 are configured to handle other types of commands in addition to the above-described commands for accessing the set of hash lists 36. For example, in some arrangements, the components 26, 28, 30 are further configured to perform tasks that access a shared data structure such as a shared doubly linked list (e.g., a shared least-recently-used queue of entries). Similar tasks are described in a copending U.S. Patent Application filed on even date herewith and entitled "METHODS AND APPARATUS FOR ACCESSING A DOUBLY LINKED LIST IN A DATA STORAGE SYSTEM," by the same inventor as in the present application and assigned to the same assignee as the present application, the teachings of which are hereby incorporated by reference in their entirety.

As described above, embodiments of the invention are directed to techniques for accessing data elements using a set of hash lists 36. The use of the set of hash lists 36 alleviates the need for a conventional track table that scales with the size of the set of disk drives, and requires less time to determine whether data blocks can be accessed from the cache than searching a single list of entries that corresponds to every location within the cache. Moreover, operations which access the set of hash lists 36 can be performed within a set of memory circuit boards 28 that stores the set of hash lists 36 rather than another circuit board (e.g., a front-end interface 26, a back-end interface 30, etc.) in order to, among other things, (i) provide improved performance, (ii) free the other circuit board to perform other tasks, and (iii) reduce traffic in the interconnection mechanism 33 between the set of memory circuit boards 28 and the other circuit board and avoid latencies otherwise associated with such traffic. The features of the invention, as described above, may be employed in electronic systems, components and procedures such as those of EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, in connection with FIGS. 11 through 15, that the components 26, 28, 30 were described as including a single front-end interface 26, a single memory circuit board 28 and a single back-end interface 30 by way of example only and for simplicity. In some arrangements, the data storage system 22 includes multiple front-end interfaces 26, multiple memory circuit boards 28 and multiple back-end interfaces 30 (e.g., for increased throughput, for redundancy, etc.). In such arrangements, the multiple front-end interfaces 26 can be configured to handle requests for data elements 40 from multiple external devices 24 (e.g., each front-end interface being assigned to support a particular set of external devices 24) for load balancing purposes. Additionally, the front-end interfaces 26 can be configured to send communications (e.g., searches and requests for data elements 40) to particular memory circuit boards 28 based on the generated hash pointers (e.g., each memory circuit board 28 being assigned to a particular set of hash pointers) thus enabling the cache 34 and the set of hash tables 36 to be distributed across multiple memory circuit boards 28.

Additionally, it should be understood that the invention was described as being implemented in a data storage system 22 by way of example only. The invention can be implemented in other electronic devices and systems as well such as a general purpose computer, a specialized computer system, etc.

Furthermore, it should be understood that particular modifications can be made to various components of the data storage system 22. For example, the memory circuit boards 28 were shown and described as including an internal interconnect port 72. In some arrangements, the memory circuit board 28 includes multiple internal interconnect ports 72 (e.g., dual ports, point-to-point connections to each front-end interface 26 and each back-end interface 30, etc.).

Additionally, it should be understood that the maximum number of entries 92 permitted in each hash list 36 and the number N of hash lists 36 in the set of hash lists 36 are configurable. To shorten the maximum number of entries 92 permitted in each hash list 36 in order to reduce the lengths of the hash lists 36 (thus decreasing search time), the number N can be increased so that the data storage system 22 uses more hash lists 36.

Furthermore, it should be understood that different hash functions can be used for different applications. For example, in an application in which data elements 40 are request in a fairly arbitrary manner, a simple truncation technique may be suitable. As another example, in an application in which data elements 40 on a particular disk drive 32 are accessed more frequently than data elements 40 on other disk drives 32, a more sophisticated hash function can be used in order to more evenly distribute the use of entries 92 among multiple hash lists 36.

Additionally, it should be understood that the memory circuit boards 28 can be configured to provide copies 42 of data elements 44 simply in response to at least partial matches. For example, as soon as a memory circuit board 28 responds to a search command by selecting a hash list 36, and finding an entry 92 in that hash list 36 having a matching disk identifier DD, the memory circuit board 28 can provide the copy 42 of the data element 40 corresponding to that entry 92. The memory circuit board 28 can continue searching for similar matches as well. If it turns out that the provided copy 42 of the data element 40 is correct, i.e., is the requested data element 40, no time was wasted in providing the copy 42 of the data element 40. However, if it turns out that the provided copy 42 of the data element 40 is not correct, i.e., is not the data element 40, the memory circuit board 28 can simply direct the front-end interface 26 to ignore it. Accordingly, the data storage system 22 can provide, as a performance optimization, a pre-fetching technique to reduce retrieval time in some situations.

Furthermore, it should be understood that the set of front-end interfaces 26 and the set of back-end interfaces 30 can be configured to monitor the set of hash lists 36. For example, the interfaces 26, 30 can periodically or continuously read the entire hash lists 36 using a READ_LIST command to verify that each hash list 36 is properly configured as a linked list data structure, and perhaps correct improperly configured linked lists (e.g., preventing lost entries 92, etc.).

Additionally, it should be understood that particular discussions of operations of the front-end interfaces 26 also apply to the back-end interfaces 30, and vice versa. For example, it should be understood that the front-end interfaces 26 can perform the procedure 200 of FIG. 12 as well as the back-end interfaces 30. In particular, when the front-end interfaces 26 add new data elements to the cache 34 on behalf of the external devices 24 (which will be subsequently written to the set of disk drives 32), the front-end interfaces 26 direct the memory circuit boards 28 to update (e.g., add entries 92 to) the set of hash lists 36 to reflect the new data elements.

Furthermore, it should be understood that the head entries 96 of the set of hash lists 36 (FIGS. 4 and 5) were described above as residing in the memory locations 76 of the memory circuit board 28 (FIG. 3) external to the controller 74 by way of example only. In some arrangements, the head entries 96 reside in the controller 74 (e.g., in a cache memory within the controller 74) for faster access.

Additionally, it should be understood that, in some arrangements, the controller 74 caches the set of hash lists 36 or portions of the set of hash lists 36. This caching is similar to processor caching of data in that it provides faster access to the hash list entries.

Furthermore, it should be understood that the above-described searches were comparisons between the disk address and contents of the disk address field 122 (FIG. 6) by way of example only. Other searches are suitable for use as well. For example, in some arrangements, the searches are based on contents of other fields such as contents of the write pending field 130, contents of the error detection code field 134, or combinations of contents from multiple fields (e.g., using data/mask combinations and operations).

Additionally, it should be understood that, in some arrangements, a search can be a read of a cache slot itself. Accordingly, the operations can return real data not just pointers. Such modifications and enhancements are intended to be part of embodiments of the invention, and the invention should be limited only by the spirit and scope of the claims.

What is claimed is:

1. A data storage system, comprising:
    a set of disk drives to store a data element;
    a set of memory circuit boards to store a set of hash lists and a cache; and
    a front-end interface coupled to the set of disk drives and the set of memory circuit boards, wherein the front-end interface is configured to:
        receive a request for the data element, the request including a disk address identifying a set of disk drive locations that stores the data element,
        perform a hash function on the disk address in order to generate a hash pointer, and
        provide a search command, the disk address and the generated hash pointer to the set of memory circuit boards,
    and wherein the set of memory circuit boards is configured to:
        receive the search command, the disk address, and the hash pointer from the front-end interface,
        search the set of hash lists based on the hash pointer and the disk address, and
        provide an indication to the front-end interface indicating whether the set of hash lists includes an entry indicating that the data element resides in cache.

2. The data storage system of claim 1 wherein the set of memory circuit boards is configured to search the set of hash lists by:
  selecting a hash list from the set of hash lists based on the hash pointer, each hash list including a set of entries, each entry including a disk address field; and
  determining whether the disk address of the request for the data element matches contents of the disk address field of an entry of the selected hash list in order to ascertain whether the set of hash lists includes an entry indicating that the cache stores the data element, wherein the set of hash lists includes an entry indicating that the cache stores the data element when the disk address matches contents of the disk address field of an entry of the selected hash list, and wherein the set of hash lists does not include an entry indicating that the cache stores the data element when the disk address does not match contents of the disk address field of any entry of the selected hash list.

3. The data storage system of claim 1 wherein a second disk address identifies caching of a second data element, wherein each hash list includes a set of entries, wherein each entry includes a disk address field; and wherein the front-end interface circuit board is further configured to:
  perform the hash function on the second disk address in order to generate a second hash pointer, and
  wherein the set of memory circuit boards is further configured to:
    add, to the set of hash lists, a second entry based on the generated second hash pointer and the second disk address, the second entry identifying the second data element.

4. The data storage system of claim 3 wherein the set of memory circuit boards is configured to add the second entry by:
  selecting a hash list of the set of hash lists based on the second hash pointer; and
  attaching the second entry to the selected hash list.

5. The data storage system of claim 4 wherein the selected hash list is a linked list data structure, wherein the set of memory circuit boards is configured to attach the second entry by:
  placing the second entry at a head of the linked list data structure.

6. The data storage system of claim 4 wherein the set of memory circuit boards is further configured to:
  determine a number of entries in the selected hash list; and
  delete a third entry from the selected hash list when the number of entries in the selected hash list is greater than a predetermined limit.

7. The data storage system of claim 6 wherein the selected hash list is a linked list data structure, and wherein the set of memory circuit boards is configured to delete the third entry by:
  removing the third entry from a tail of the linked list data structure.

8. The data storage system of claim 1 wherein the disk address includes a disk identifier that identifies a particular disk of the set of disks, a cylinder identifier that identifies a particular cylinder, and a head identifier that identifies a particular head; and wherein the set of memory circuit boards is configured to search the set of hash lists by:
  selecting a hash list of the set of hash lists based on the generated hash pointer, each hash list including a set of entries, each entry including a disk address field; and
  comparing the disk address to contents of the disk address field of at least one entry in the selected hash list to determine whether the data element is cached.

9. The data storage system of claim 8 wherein the set of memory circuit boards is configured to:
  provide a data element identified by a particular entry of the selected hash list regardless of whether the disk address exactly matches with contents of the disk address field of the particular entry when the disk identifier of the disk address matches with a disk identifier in the contents of the disk address field of the particular entry.

10. A memory circuit board, comprising:
  an input/output interface;
  memory to store a set of hash lists; and
  a controller coupled to the input/output interface and the memory, the controller being configured to:
    receive, through the input/output interface, (i) a search command, (ii) a disk address identifying a data element stored on a set of disk drives, and (iii) a hash pointer resulting from performance of a hash function on the disk address,
    search the set of hash lists based on the hash pointer and the disk address, and
    indicate whether the set of hash lists includes an entry indicating that the data element resides in cache.

11. The memory circuit board of claim 10 wherein the controller is configured to search the set of hash lists by:
  selecting a hash list from the set of hash lists based on the hash pointer, each hash list including a set of entries, each entry including a disk address field; and
  determining whether the disk address of the request for the data element matches contents of the disk address field of an entry of the selected hash list in order to ascertain whether the set of hash lists includes an entry indicating that the cache stores the data element, wherein the set of hash lists includes an entry indicating that the cache stores the data element when the disk address matches contents of the disk address field of an entry of the selected hash list, and wherein the set of hash lists does not include an entry indicating that the cache stores the data element when the disk address does not match contents of the disk address field of any entry of the selected hash list.

12. The memory circuit board of claim 10 wherein a second disk address identifies caching of a second data element, wherein each hash list includes a set of entries, wherein each entry includes a disk address field, wherein a front-end interface circuit board is configured to perform the hash function on the second disk address in order to generate a second hash pointer, and wherein the set of memory circuit boards is further configured to:
  add, to the set of hash lists, a second entry based on the second hash pointer generated by the front-end interface circuit board and the second disk address, the second entry identifying the second data element.

13. The memory circuit board of claim 12 wherein the controller is configured to add the second entry by:
  selecting a hash list of the set of hash lists based on the second hash pointer; and
  attaching the second entry to the selected hash list.

14. The memory circuit board of claim 13 wherein the selected hash list is a linked list data structure, wherein the controller is configured to attach the second entry by:
  placing the second entry at a head of the linked list data structure.

15. The memory circuit board of claim 13 wherein the controller is further configured to:
  determine a number of entries in the selected hash list; and
  delete a third entry from the selected hash list when the number of entries in the selected hash list is greater than a predetermined limit.

16. The memory circuit board of claim 15 wherein the selected hash list is a linked list data structure, and wherein the controller is configured to delete the third entry by:

removing the third entry from a tail of the linked list data structure.

17. A memory circuit board, comprising:

an input/output interface;

memory to store a set of hash lists; and control means for:

receiving, through the input/output interface, (i) a search command, (ii) a disk address identifying a data element stored on a set of disk drives, and (iii) a hash pointer resulting from performance of a hash function on the disk address, searching the set of hash lists based on the hash pointer and the disk address, and indicating whether the set of hash lists includes an entry indicating that the data element resides in cache.

18. The data storage system of claim 1 wherein the set of memory circuit boards is further configured to:

incrementally add entries to hash lists of the set of hash lists to grow the size of the set of hash lists in response to storing data elements in the cache.

19. The data storage system of claim 18 wherein the set of memory circuit boards is further configured to:

detect that a particular hash list of the set of hash lists exceeds a predetermined limit and, in response to such detection, delete an entry from the particular hash list of the set of hash lists to conserve memory space used by that particular hash list.

20. The memory circuit board of claim 10 wherein the controller is further configured to:

incrementally add entries to hash lists of the set of hash lists to grow the size of the set of hash lists in response to storing data elements in the cache.

21. The memory circuit board of claim 20 wherein the controller is further configured to:

detect that a particular hash list of the set of hash lists exceeds a predetermined limit and, in response to such detection, delete an entry from the particular hash list of the set of hash lists to conserve memory space used by that particular hash list.

22. The memory circuit board of claim 17 further comprising:

means for incrementally adding entries to hash lists of the set of hash lists to grow the size of the set of hash lists in response to storing data elements in the cache; and means for detecting that a particular hash list of the set of hash lists exceeds a predetermined limit and, in response to such detection, deleting an entry from the particular hash list of the set of hash lists to conserve memory space used by that particular hash list.

* * * * *

UNITED STATES PATENT AND TRADEMARK OFFICE
CERTIFICATE OF CORRECTION

PATENT NO. : 7,234,021 B1 Page 1 of 1
APPLICATION NO. : 09/972314
DATED : June 19, 2007
INVENTOR(S) : Kendell A. Chilton It is certified that error appears in the above-identified patent and that said Letters Patent is hereby corrected as shown below:

Title Page, INID Code (22), "October 8, 2001" should read --October 5, 2001--.

Signed and Sealed this

Fifteenth Day of January, 2008

JON W. DUDAS
*Director of the United States Patent and Trademark Office*